United States Patent
Takano et al.

(10) Patent No.: US 12,511,574 B2
(45) Date of Patent: Dec. 30, 2025

(54) PROCESSING CONDITION SEARCH DEVICE AND PROCESSING CONDITION SEARCH METHOD

(71) Applicant: Hitachi, Ltd., Tokyo (JP)

(72) Inventors: Naoto Takano, Tokyo (JP); Hyakka Nakada, Tokyo (JP); Takeshi Ohmori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1231 days.

(21) Appl. No.: 17/209,765

(22) Filed: Mar. 23, 2021

(65) Prior Publication Data

US 2021/0357810 A1 Nov. 18, 2021

(30) Foreign Application Priority Data

May 18, 2020 (JP) .................................. 2020-086554

(51) Int. Cl.
*G06F 16/245* (2019.01)
*G06F 16/22* (2019.01)
*G06N 20/00* (2019.01)

(52) U.S. Cl.
CPC ............. *G06N 20/00* (2019.01); *G06F 16/22* (2019.01); *G06F 16/245* (2019.01)

(58) Field of Classification Search
CPC ....... G06N 20/00; G06F 16/22; G06F 16/245; H01L 21/02; H01L 21/67
See application file for complete search history.

(56) References Cited

U.S. PATENT DOCUMENTS 5,473,532 A 12/1995 Unno et al.
5,993,050 A 11/1999 Miura
(Continued)

FOREIGN PATENT DOCUMENTS

CN 1098502 C 1/2003
CN 1720490 A 1/2006
(Continued)

OTHER PUBLICATIONS

Office Action mailed Aug. 31, 2023 in Taiwanese Application No. 111149948.
(Continued)

*Primary Examiner* — Phenuel S Salomon
(74) *Attorney, Agent, or Firm* — Miles & Stockbridge, P.C.

(57) ABSTRACT

Target processing conditions are searched while reducing a process development time and process development costs. A processing condition search device includes a learning database including a processing database storing target processing data for a target process and a reference processing database storing reference processing data for a reference process, a teachered learning execution unit that estimates an I/O model of the target process, which is an I/O model between a target description variable and a target objective variable, a transfer learning execution unit that estimates the I/O model of the target process using a reference I/O mode between a reference description variable and a reference objective variable, and the target processing data, and a transferability determination unit that determines whether the teachered learning execution unit or the transfer learning execution unit is used to estimate the I/O model of the target process.

11 Claims, 21 Drawing Sheets

(56) References Cited

U.S. PATENT DOCUMENTS

| | | | |
|---|---|---|---|
| 6,738,682 B1* | 5/2004 | Pasadyn | G05B 19/41865 700/51 |
| 7,386,426 B1* | 6/2008 | Black | G06Q 10/04 703/2 |
| 2003/0010914 A1 | 1/2003 | Takane et al. | |
| 2003/0140039 A1 | 7/2003 | Ferguson et al. | |
| 2008/0021571 A1 | 1/2008 | Kokotov et al. | |
| 2008/0279434 A1 | 11/2008 | Cassill | |
| 2009/0120580 A1 | 5/2009 | Kagoshima et al. | |
| 2009/0240336 A1 | 9/2009 | Vander Meulen et al. | |
| 2011/0131162 A1 | 6/2011 | Kaushal et al. | |
| 2014/0222376 A1 | 8/2014 | Kao et al. | |
| 2015/0161520 A1 | 6/2015 | Kaushal et al. | |
| 2017/0018403 A1 | 1/2017 | Koronel | |
| 2017/0055177 A1 | 2/2017 | Son et al. | |
| 2017/0109646 A1 | 4/2017 | David | |
| 2017/0153611 A1 | 6/2017 | Fujii et al. | |
| 2017/0193400 A1* | 7/2017 | Bhaskar | G01Q 30/02 |
| 2018/0052907 A1 | 2/2018 | Greifeneder et al. | |
| 2019/0028663 A1 | 1/2019 | Itano et al. | |
| 2019/0064751 A1 | 2/2019 | Ohmori et al. | |
| 2019/0064755 A1* | 2/2019 | Ohmori | G06F 17/18 |
| 2019/0073588 A1 | 3/2019 | Kawaguchi | |
| 2019/0122078 A1 | 4/2019 | Ura et al. | |
| 2019/0286632 A1* | 9/2019 | Okuyama | G06F 16/2462 |
| 2019/0295827 A1 | 9/2019 | Ohmori et al. | |
| 2019/0311220 A1* | 10/2019 | Hazard | G06F 18/2148 |
| 2019/0340316 A1* | 11/2019 | Lill | G06N 10/00 |
| 2021/0064680 A1* | 3/2021 | Maheshwari | G06F 16/9535 |
| 2021/0407814 A1 | 12/2021 | Cheng | |
| 2022/0067911 A1 | 3/2022 | Narasimhan et al. | |
| 2023/0075229 A1 | 3/2023 | Abe et al. | |

FOREIGN PATENT DOCUMENTS

| | | |
|---|---|---|
| JP | H1086039 A | 4/1998 |
| JP | 2012074007 A | 4/2012 |
| JP | 2013518449 A | 5/2013 |
| JP | 2015162113 A | 9/2015 |
| JP | 2016-191966 A | 11/2016 |
| JP | 2017102619 A | 6/2017 |
| JP | 2017157112 A | 9/2017 |
| JP | 2019-508789 A | 3/2019 |
| JP | 2019040984 A | 3/2019 |
| JP | 2019046380 A | 3/2019 |
| JP | 2019047100 A | 3/2019 |
| JP | 2019079214 A | 5/2019 |
| JP | 2019159864 A | 9/2019 |
| JP | 2021-135812 A | 9/2021 |
| JP | 2021-182329 A | 11/2021 |
| KR | 100463256 B1 | 1/2005 |
| TW | 201104452 A | 2/2011 |
| TW | 201202876 A | 1/2012 |
| TW | 201432479 A | 8/2014 |
| WO | 2017149267 A1 | 9/2017 |

OTHER PUBLICATIONS

Search Report mailed Aug. 9, 2022 in International Application No. PCT/JP2022/020930.

Office Action mailed Mar. 17, 2022 in Taiwanese Application No. 110110829.

Numata et al. "Experiments of a New Meta-Heuristics to Reduce the Search Space by Partially Fixing of the Solution Values—Application to TravelingSalesman Problem" Transactions of the Institute of Systems, Control and Information Engineers, vol. 17, No. 3, Mar. 2004, pp. 103-112.

Office Action dated Apr. 6, 2020 in Taiwanese Application No. 108103411.

Office Action dated Jun. 26, 2020 in Korean Application No. 10-2019-0005491.

Office Action dated Jul. 28, 2020 in Taiwanese Application No. 108103034.

* cited by examiner

PROCESSING CONDITION SEARCH DEVICE AND PROCESSING CONDITION SEARCH METHOD

CROSS-REFERENCE TO RELATED APPLICATION

This application claims priority to Japanese Patent Application No. 2020-086554 filed on May 18, 2020, the entire contents of which are incorporated by reference herein.

BACKGROUND OF THE INVENTION

The present invention relates to a processing condition search device and a processing condition search method for searching for processing conditions that realize a desired processing result.

In a semiconductor process, desired semiconductor device processing is performed by setting appropriate processing conditions obtained by a process development to a processing device. In this case, the processing conditions include at least one or more control parameter items of the processing device.

In recent years, many new items have been added to the processing conditions due to the expansion of a control range of the processing device caused by the introduction of new materials and the complexity of a device structure. In order to fully draw out the performance of the processing device, optimization of processing conditions is indispensable. For that reason, attention has been paid to a method for deriving the processing conditions that realize the excellent processing result required by process developers by machine learning. In this example, the processing result includes at least one or more items indicating the shape and properties of a sample that has been processed. Hereinafter, the above excellent processing result is called "target processing result".

The target processing result will be described with reference to an example of an etching process in which a Line and Space pattern is formed on a sample. FIG. 1 shows a cross-sectional view of a typical Line and Space pattern sample before and after etching. A sample in which a mask 2 is formed on an etch film 1 is etched so that the etch film 1 in which there is no mask 2 is preferentially etched to form a trench 3. In the cross-sectional view after etching, dashed lines indicate the positions of the mask 2 and the etch film 1 before etching. When a trench depth h is an item of the processing result, the target processing result is defined as a predetermined value or a predetermined range of the value such as "trench depth h of 100 nm" and "trench depth h of 100 nm or more". The processing condition which realizes such a target processing result is called "target processing condition".

The method of deriving the target processing condition by machine learning is generally performed by the following procedure. First, a target processing result is set. On the other hand, multiple basic processing conditions are determined to execute processing on a sample based on the basic processing conditions, and processing data including the basic processing conditions and the processing results is acquired to build an initial processing database. A model that describes a correlation between the basic processing conditions and the processing results is estimated by machine learning based on the initial processing database. Hereinafter, the above model will be called "I/O model" since when it is assumed that the processing condition is an input x and the processing result is an output y, the model describes an I/O relation $y=f(x)$. The processing conditions (called "prediction processing conditions") that meet the target processing results are predicted based on the estimated I/O model.

Subsequently, a verification experiment is performed by using the obtained prediction processing conditions. That is, processing based on the prediction processing conditions is executed, and it is determined whether or not the obtained processing result is a target processing result. When the target processing result is obtained, the verification experiment is finished using the prediction processing condition as the target processing condition. On the other hand, if the target processing result is not obtained, the processing data obtained in the verification experiment is added to the database to update the I/O model, and the prediction and verification experiment of the processing condition are repeated until the target processing result is obtained.

In a derivation method of such a target processing condition, an accuracy of the I/O model used for predicting the target processing condition is important. FIG. 2 is a graph showing a correlation (I/O relationship) between the processing conditions and the processing results. In the graph, a dashed line 10 represents a true I/O relationship while a solid line 11A and a chain line 11B show I/O relationships represented by an I/O model A and an I/O model B, respectively. The accuracy of the I/O model can be evaluated as similarity to the true I/O relationship indicated by the dashed line. In that case, the I/O relationship of the I/O model A (solid line 11A) is similar to the true I/O relationship (dashed line 10), and the accuracy of the I/O model A is high. On the other hand, the I/O relationship of the I/O model B (chain line 11B) deviates from the true I/O relationship (dashed line 10), and the accuracy of the I/O model B is low.

The processing result by the prediction processing condition obtained based on the low accuracy I/O model is likely to come to a result deviating from the target processing result. Therefore, the number of verification experiments until the target processing condition is obtained increases. As a result, a process development period and process development costs such as experimental costs and labor costs increase. In order to avoid such a situation, there is a need to improve the accuracy of the I/O model.

In order to improve the accuracy of the I/O model, a large-scale initial processing database can be built in advance. However, in that method, there is a need to repeat processing many times for building the initial processing database, and the above method is not a fundamental solution to reduce the process development period and process development cost.

As a method to improve the accuracy of the I/O model while reducing the number of acquisitions of processing data for building the initial processing database, there is a method of utilizing the processing data acquired in a process (called "reference process") different from a process (called "target process") that is to derive the processing conditions. Specifically, an I/O model (called a "reference I/O model") that describes the I/O relationship in the reference process is estimated based on a database (called "a reference processing database") of processing data (called a "reference processing data") acquired in the reference process, and the estimated reference I/O model is referred to for prediction in the target process.

Japanese Patent Application Publication No. 2019-47100 discloses, "A computer that determines the control parameters of processing performed on a sample, includes a storage unit that stores a first model representing a correlation between a first processing output obtained by measuring a first sample used for production in which the process has been performed, and a second processing output obtained by measuring a second sample which is easier to measure than the first sample, and a second model representing a correlation between control parameters for processing performed on the second processing output and the second processing output; and an analysis unit for calculating target control parameters for processing performed on the first sample based on a target processing output of the target first processing output, the first model, and the second model" "so that optimal control parameters can be calculated while reducing the cost of process development". In addition, in Japanese Patent Application Publication No. 2019-47100, when a variable of the processing output of a substitute sample which is the second sample is A and a variable of the processing output of an actual sample which is the first sample is B, "a qualitative real sample-substitute sample relation model that A is also larger as B is larger" is disclosed as an embodiment.

SUMMARY OF THE INVENTION

Japanese Patent Application Publication No. 2019-47100 leverages the processing data of the second sample as the reference processing data to estimate the reference I/O model. Referring to the reference I/O model, the processing conditions of the first sample are determined.

In order that the method of predicting processing in the target process with reference to the reference I/O model as described above is made effective, it is considered that some conditions need to be met. FIG. 3A is a graph showing an I/O relationship (solid line 30) of the estimated I/O model and a true I/O relationship (dashed line 20) of the target process. The I/O model is estimated based on processing data including processing results acquired by setting the multiple basic processing conditions for the target process. In this example, the set basic processing conditions are small (black dots represent the processing data; hereinafter the same applies to FIGS. 3B and 3C), and the accuracy of the I/O model is low. FIG. 3B is a graph showing an I/O relationship (solid line 31) of the estimated reference I/O model and a true I/O relationship (dashed line 21) of the reference process. The reference I/O model is estimated based on the reference processing data stored in the reference processing database for the reference process. In this example, the reference I/O model is highly accurate because the reference processing database is large in scale. FIG. 3C is a graph showing an I/O relationship (solid line 32) of the I/O model estimated by performing transfer learning referring to the reference I/O model shown in FIG. 3B and a true I/O relationship (dashed line 20) of the target process. The processing data of the target process used for the transfer learning is the same as in FIG. 3A, but since the true I/O relationship (dashed line 20) of the target process and the true I/O relationship (dashed line 21) of the reference process are similar to each other, the accuracy of the I/O model estimated by the transfer learning is improved more than the accuracy of the I/O model shown in FIG. 3A.

The similarity between the true I/O relationships f and g includes not only cases where those true I/O relationships generally match each other but also cases where the I/O relationships generally match each other except for constants and coefficient differences. That is, the similarity includes cases where $f \cong g$ and $f \cong ag+b$ are met. For example, if both the target process and the reference process are etching processes for the same sample, and only the processing times of those processes are different from each other, such as 10 seconds and 100 seconds, the basic function characteristics are common even if there is a difference of almost 10 times in the processing results. That is, $f \cong 10g$ is established for the true I/O relationship, and the effect of applying transfer learning is expected.

As described above, it is conceivable that the method of leveraging the reference processing data of the reference process (transfer learning) is effective when, for example, the true I/O relationships of the target process and the reference process are similar to each other, or the reference I/O model is highly accurate as compared with the I/O model estimated only from the target processing data, but the above method is not necessarily effective if those conditions are not met.

Since the semiconductor processes have a wide variety of samples, processing devices, and processing processes, there are generally many candidates for reference processing data. However, the accuracy improvement of the I/O model may not be obtained as much as expected depending on the selection of the reference processing data. For example, even if the target process and the reference process are the same etching process and the processing result item is the etching amount in any process, if the material of the etch film of the sample to be processed is different between those processes, the characteristics of the etching rate for the processing conditions are significantly different therebetween. For that reason, there is a concern that the true I/O relationship is not similar in the first place.

Furthermore, even if reference processing which is similar with the target process in the true I/O relationship is selected to estimate the target I/O model, if the reference processing data is remarkably small and a sufficiently accurate reference I/O model cannot be obtained, the accuracy improvement by referring to the reference I/O model may not be obtained.

If such inappropriate reference processing data is leveraged, the accuracy of the I/O model to be predicted cannot be improved, leading to an increase in process development period and process development cost.

The present invention aims to provide a processing condition search device and a processing condition search method for searching for target processing conditions while suppressing a process development period and a process development cost by avoiding the utilization of inappropriate reference processing data.

According to an aspect of the present invention, there is provided a processing condition search device that searches for a processing condition of a target process, including: a target processing result setting unit that sets a target processing result in the target process; a learning database including a processing database that stores target processing data as a combination of the processing condition and the processing result in the target process, and a reference processing database that stores reference processing data as a combination of the processing condition and the processing result in a reference process; a teachered learning execution unit that estimates an I/O model of the target process as an I/O model between a target description variable and a target objective variable, with the processing condition of the target processing data defined as the target description variable and the processing result defined as the target objective variable, using the target processing data; a transfer learning execution unit that estimates an I/O model of the target process using a reference I/O model between a reference description variable and a reference objective variable and the target processing data, with the processing condition of the reference processing data defined as the reference description variable and the processing result defined as the reference objective variable; a transferability determination unit that determines whether the teachered learning execution unit or the transfer learning execution unit is used to estimate the I/O model of the target process; and a processing condition prediction unit that predicts the processing condition for realizing the target processing result, using the I/O model of the target process.

The target processing conditions are searched while reducing the process development time and the process development costs.

Other issues and new features will be revealed from the description and attached drawings attached thereto.

DETAILED DESCRIPTION OF THE PREFERRED EMBODIMENTS

Figure 1:
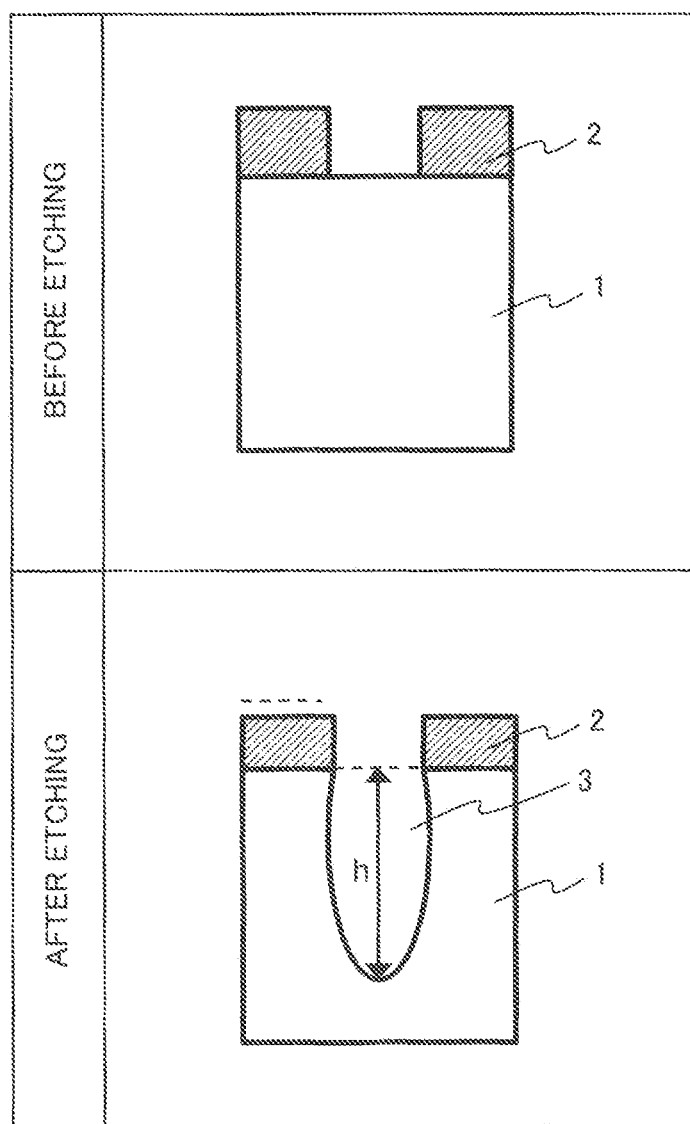
FIG. 1 is a cross-sectional view of a sample of a typical Line and Space pattern before and after etching.
Figure 2:
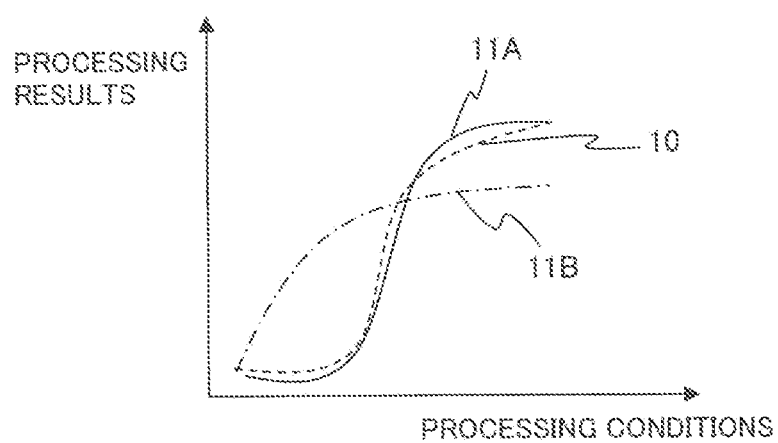
FIG. 2 is a graph showing a correlation (I/O relationship) between processing conditions and processing results.

Hereinafter, embodiments of the present invention will be described with reference to drawings. However, the present invention is not interpreted only in the description of the embodiments shown below. It is easily understood by those skilled in the art that a specific configuration can be changed to the extent not deviating from the concept or spirit of the present invention. Further, the position, size, shape, and the like of each configuration shown in the drawings herein may not represent the actual position, size, shape, or the like in order to facilitate understanding of the invention. Therefore, the present invention is not limited to the position, size, shape, or the like disclosed in the drawing or the like.

First Embodiment

Figure 4:
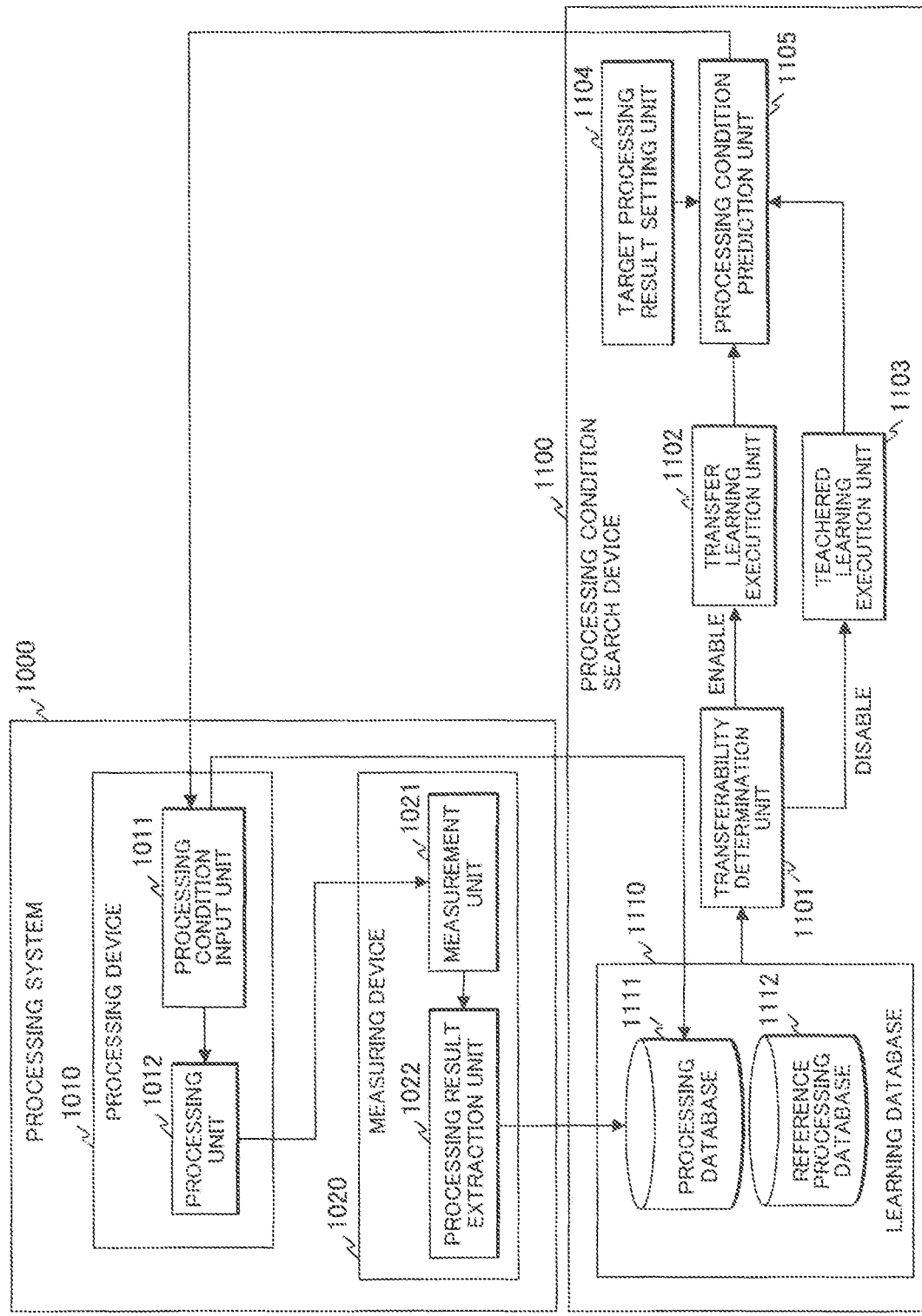
FIG. 4 is a block diagram showing a configuration example of a processing condition derivation system according to a first embodiment.

FIG. 4 is a block diagram showing a configuration example of a processing condition derivation system according to a first embodiment. The processing condition derivation system has a processing system 1000 and a processing condition search device 1100. A processing device 1010, a measuring device 1020, and a processing condition search device 1100 included in the processing condition derivation system are connected to each other directly or through a network.

The processing system 1000 is a system that performs processing based on processing conditions and extracts the processing result from a processed sample. The processing system 1000 includes the processing device 1010 and the measuring device 1020.

The processing device 1010 includes a processing condition input unit 1011 and a processing unit 1012. The processing condition input unit 1011 accepts the processing conditions as input and outputs the processing conditions to the processing unit 1012. The processing unit 1012 performs processing on the sample based on the processing conditions input from the processing condition input unit 1011.

The type and content of the processing performed by the processing device 1010 are not limited. The processing device includes, for example, a lithography device, a film forming device, a pattern processing device, an ion injection device, a heating device, a cleaning device, and the like. The lithography device includes an exposure device, an electron drawing device, and an X-ray drawing device. The film forming device includes a CVD, a PVD, a vapor deposition device, a sputtering device, a thermal oxidation device, and the like. The pattern processing device includes a wet etching device, a dry etching device, an electron beam processing device, a laser processing device, and the like. The ion injection device includes a plasma doping device, an ion beam doping device, and the like. The heating device includes a resistance heating device, a lamp heating device, a laser heating device, and the like. The cleaning device includes a liquid cleaning device, an ultrasonic cleaning device, and the like.

The measuring device 1020 includes a measurement unit 1021 and a processing result extraction unit 1022. The measurement unit 1021 measures values indicating a shape, properties, and the like of the sample processed by the processing device 1010. In the processing result extraction unit 1022, the measurement result by the measurement unit 1021 is extracted as a processing result for a predetermined item.

The content and method of the measurement performed by the measuring device 1020 are not limited. The measuring device 1020 acquires values indicating the shape and properties of the sample by measuring reflections, transmission, interference, absorption, polarization spectrum, and the like of light, laser, and X-rays incident on the sample. For example, the measuring device includes a measuring device using an electron microscope, an optical monitor, a temperature measuring device using infrared light, a defect detection device using a Kelvin probe force microscope, and a prober device for evaluating electrical properties.

Further, the measuring device 1020 may measure not only the measurement value for the sample after processing but also a medium such as plasma, gas, and liquid acting on the sample during processing and a product generated during processing. The medium or product does not directly represent a state of the sample, but may be useful information as a physical quantity indicating a correlation with a state of the processing or the result of the processing. For example, the measuring device 1020 may include a plasma light emission monitor using optical spectrum measurement, a sediment monitor in a processing room using infrared spectrometry, a monitor for atoms or molecules emitted from a processing object using a mass spectrometer, and an electrical characteristic monitor in a processing room using meter reading. Furthermore, the measuring device 1020 may be a sensor that acquires a power output value such as voltage, current, or power, a value of a variable electrical element such as a capacitor or coil in a matching box, a flow rate of various use gases, a temperature of a device precursor or a device component, a pressure in the processing room, an opening degree of a pressure control valve, a valve opening and closing state, a gas exhaust speed, an operation timing or an operation time of the processing or the device, and the like.

In FIG. 4, although the processing device 1010 and the measuring device 1020 are configured separately, the measuring device 1020 may be incorporated into the processing device 1010. Further, a number of measuring devices in which values to be measured may be the same or different may be provided.

The processing condition search device 1100 estimates an I/O model of the target process and predicts the target processing conditions based on the model. The processing condition search device 1100 includes a learning database 1110, a transferability determination unit 1101, a transfer learning execution unit 1102, a teachered learning execution unit 1103, a target processing result setting unit 1104, and a processing condition prediction unit 1105.

The learning database 1110 includes a processing database 1111 and a reference processing database 1112. The processing database 1111 is a database that manages processing data (called "target processing data") of a target process, and the reference processing database 1112 is a database that manages reference processing data.

The transfer learning execution unit 1102 and the teachered learning execution unit 1103 estimate the I/O models of the target process by transfer learning and teachered learning, respectively. The types of the I/O models estimated in the transfer learning execution unit 1102 and the teachered learning execution unit 1103 are, for example, neural network models and kernel regression models. For example, the type of the I/O model to be estimated may be different between the transfer learning execution unit 1102 and the teachered learning execution unit 1103 so that the I/O model estimated in the transfer learning execution unit 1102 is a neural network model, and the I/O model estimated by the teachered learning execution unit 1103 is a kernel regression model.

The transferability determination unit 1101 determines whether the transfer learning execution unit 1102 or the teachered learning execution unit 1103 is used to estimate the I/O model of the target process.

The target processing result setting unit 1104 sets the target processing result, and the processing condition prediction unit 1105 accepts the target processing result set by the target processing result setting unit 1104 as input, and predicts the target processing condition based on the target processing result and the I/O model of the target process.

Figure 5:
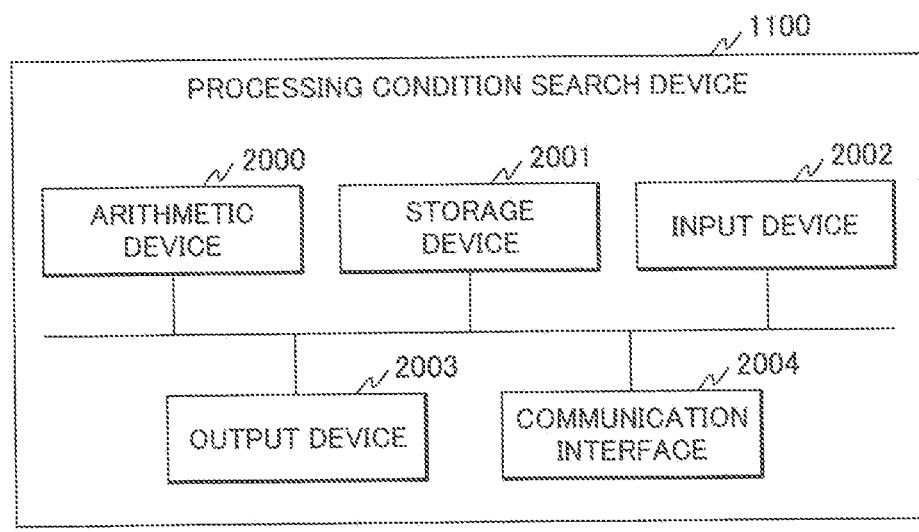
FIG. 5 is a block diagram showing a hardware configuration example of a processing condition search device.

FIG. 5 is a block diagram showing a hardware configuration example of the processing condition search device 1100. The processing condition search device 1100 includes an arithmetic device 2000, a storage device 2001, an input device 2002, an output device 2003, and a communication interface 2004. The arithmetic device 2000 executes a program for functioning as the processing condition search device 1100. The arithmetic device 2000 includes, for example, a processor (CPU), a GPU (Graphics Processing Unit), and an FPGA (Field Programmable Gate Array). The storage device 2001 is a work area of the arithmetic device 2000. The storage device 2001 also includes a non-transitory or transitory recording medium that stores various programs and data. For example, the recording medium includes a ROM (Read Only Memory), a RAM (Random Access Memory), an HDD (Hard Disk Drive, a flash memory, and so on. The input device 2002 is a device for the user to input the processing conditions, the target processing results, and the like that are input to the processing condition search device 1100. Examples of the input device 2002 include a keyboard, a mouse, a touch panel, a numeric keypad, a scanner, and the like. The output device 2003 is a device for outputting various information. Examples of the output device 2003 include a display, a printer, and the like. The communication interface 2004 is an interface for connecting to an external device over a network.

Hereinafter, a derivation procedure of the target processing conditions by the processing condition derivation system in FIG. 4 will be described.

Figure 6:
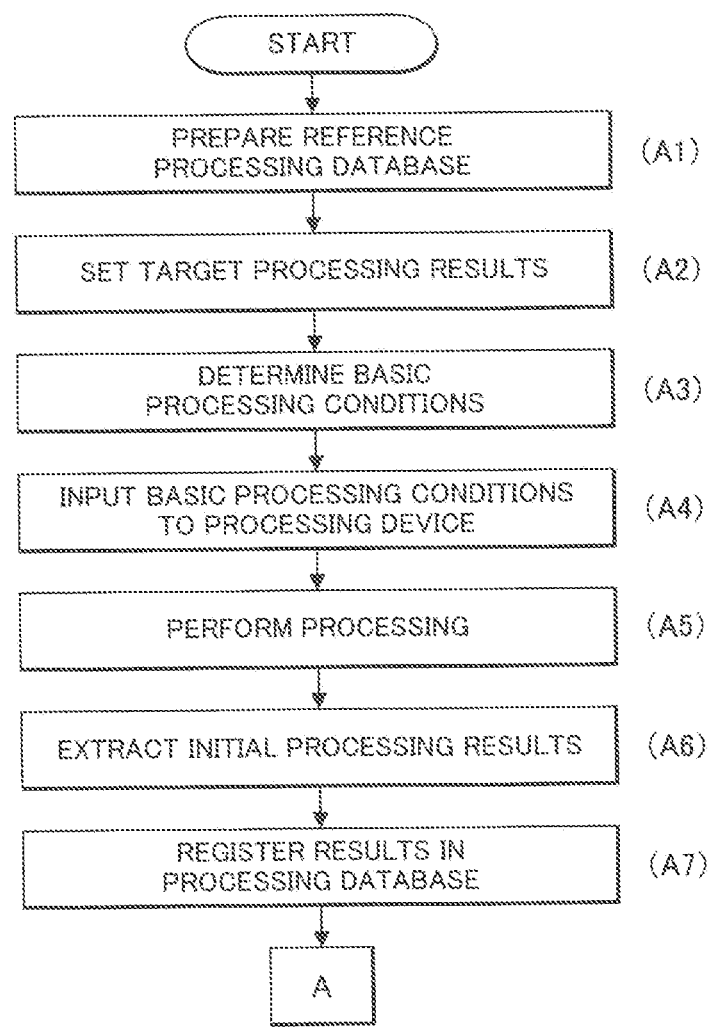
FIG. 6 is a flowchart showing a procedure from a start to a construction of an initial processing database.

FIG. 6 is a flowchart illustrating Steps (A1) to (A7) from a start to the build of the initial processing database in the derivation procedure of the target processing conditions.

(A1): The reference processing database 1112 is prepared. An example of the reference processing data will be described later.

(A2): The target processing results are set.

(A3): The basic processing conditions are determined.

(A4): The determined basic processing conditions are input to the processing device 1010.

(A5): The processing device 1010 performs processing on the target sample according to the basic processing conditions.

(A6): The measuring device 1020 extracts the processing results (initial processing results) from a sample in which the processing of the target process has been performed in (A5).

(A7): Initial processing data that is a combination of the basic processing conditions and the initial processing results in the target process is registered in the processing database 1111. The processing database 1111 in which only the initial processing data in the target process is registered may be called an initial processing database.

The flow shown in FIG. 6 includes a procedure that is positioned as a preparation in the derivation procedure of the target processing condition. For that reason, some procedures shown in FIG. 6 may not be performed in a stated order. Specifically, Step (A1) may be performed till a time of determination of the transferability determination unit 1101 to be described later, and Step (A2) may be performed till a time of prediction of the target processing conditions by the processing condition prediction unit 1105 to be described later.

The reference processing data will be described. If the target process is to "perform a process for a sample using a certain processing device", the reference process is a process in which one or more of the samples, processing devices, or processing are different from those of the target process. For example, if the target process is to "perform etching processing using etching device A for a sample having the Line and space pattern with an opening width of 10 nm", the reference process is to "perform etching processing using the etching device A for a sample having the Line and space pattern with an opening width of 100 nm", or to "perform etching processing using the etching device B for a sample having the Line and space pattern with an opening width of 100 nm". As described above, in order to obtain excellent results by transfer learning, it is important that the true I/O relationship of the target process is similar to the true I/O relationship of the reference process. However, the true I/O relationship in semiconductor processes changes due to the overlap of various factors. For example, even if a sample (called a "reference sample") of the reference process is a sample made of the same material as the sample (called a "target sample") of the target process, the true I/O relationship may not be similar because the size and geometric shape are different.

Figure 7:
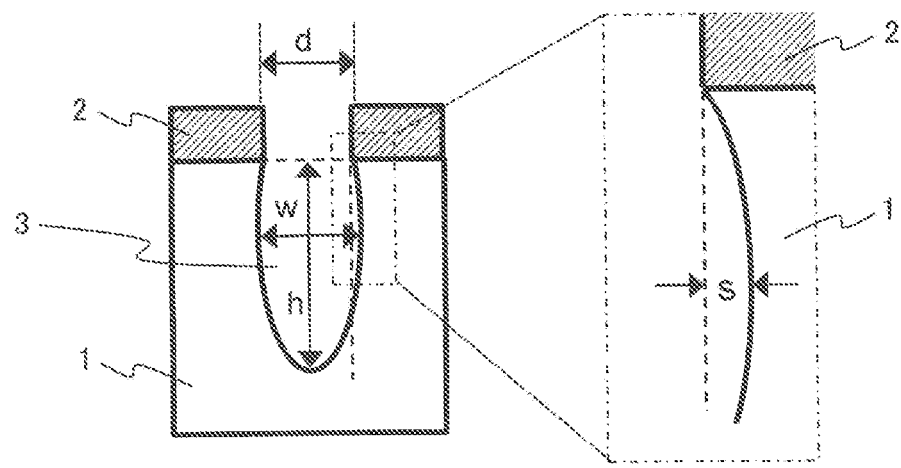
FIG. 7 shows an example of a target sample.

It is assumed that the target sample is a sample in which a Line and Space pattern as shown in FIG. 7 is formed and that both the target process and the reference process are etched with the same etching device. Under this assumption, the following example is studied as a reference sample for giving reference processing data.

Figure 8:
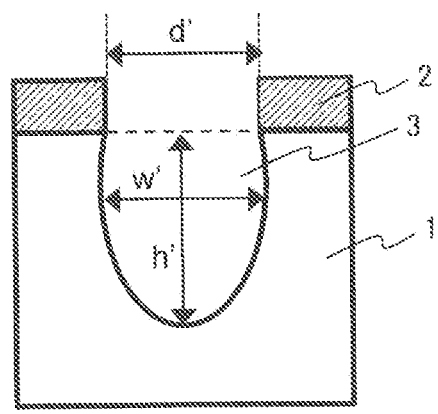
FIG. 8 shows an example of a reference sample.

FIG. 8 shows a first example of the reference sample, and the items of the processing results are a trench depth h and a trench width w. The materials of the mask 2 of the reference sample and the etch film 1 are the same as the material of the target sample, and a width d of a mask opening is different from that of the target sample.

In that case, in both the target sample and the reference sample, etching progresses by causing not only radicals but also ions accelerated by sheath to be incident at a bottom of the trench 3 while etching progresses by causing mainly only radicals to be incident on a side wall of the trench 3. In this example, since the material is the same between the target sample and the reference sample, the reaction process when etching progresses is similar between the bottoms of the trench 3 and between the side walls of the trench 3 is similar. On the other hand, since the width of the mask opening is different, the amount of ions and radicals that can reach the inside of the trench 3 is different between the target sample and the reference sample. For that reason, the characteristics of the etching rate for the processing conditions at each portion inside the trench 3 may be different between the target sample and the reference sample, that is, the true I/O relationship may not be similar.

Figure 9:
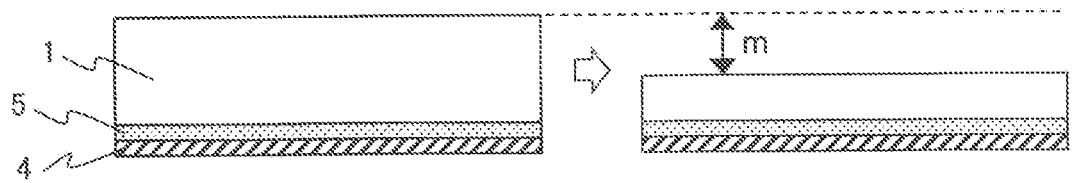
FIG. 9 shows the example of the reference sample.

FIG. 9 shows a second example of the reference sample, and the item of the processing results is a trench depth h. The reference sample in this example is a wafer in which a base film 5 is formed on a substrate 4 and an etch film 1 is formed on the base film 5. The material of the etch film 1 of the reference sample is the same as the material of the etch film 1 of the target sample. The item of the processing results of the reference process is an etching amount m of the etching film 1. As shown in FIG. 9, in a cross-sectional view, a difference in height between a dashed line indicating an upper surface of the etch film 1 before etching and the upper surface of the etch film 1 after etching is defined as an etching amount m. Both ions and radicals are incident on the etch film 1 of the reference sample as well as the bottom of the trench 3 of the target sample. Further, in this example, the material of the etch film 1 is the same between the target sample and the reference sample. Therefore, the reaction process when etching progresses is similar between the bottom of the trench 3 of the target sample and the etch film 1 of the reference sample. On the other hand, while the reference sample has a flat structure, the target sample has a trench structure, so that the amount of ions and radicals reaching the etch film is smaller in the target sample. For that reason, as in the first example, the characteristics of the etching rate for the processing condition may be different between the bottom of the trench 3 in the target sample and the surface of the reference sample, that is, the true I/O relationship may not be similar.

Figure 10:
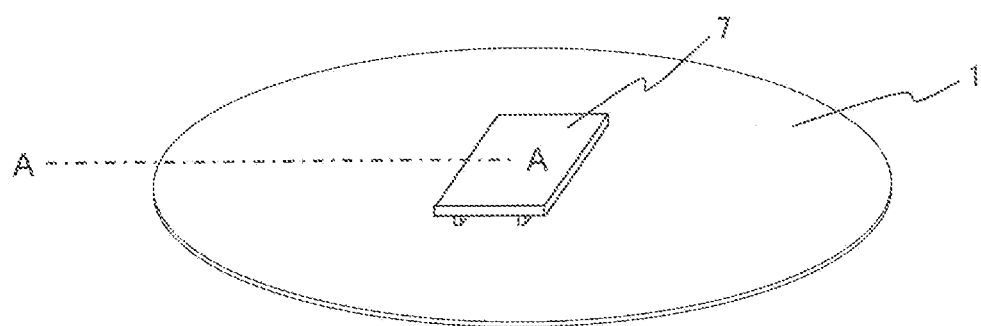
FIG. 10 shows the example of the reference sample.
Figure 11:
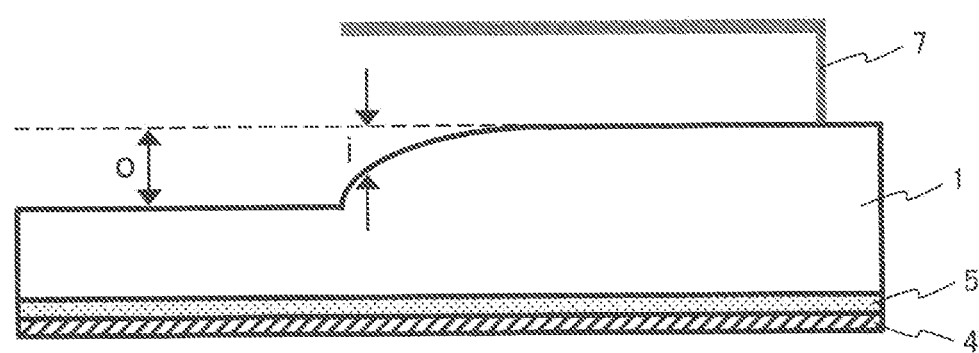
FIG. 11 shows an example of the reference sample.

FIGS. 10 to 11 show a third example of the reference sample. FIG. 10 is a bird's eye view of a wafer with a hut 7 according to the third example. FIG. 11 is a cross-sectional view taken along a line A-A of FIG. 10. The material of the etch film 1 of the reference sample is the same as the material of the etch film 1 of the target sample. The items of the processing results of the target process are a trench depth h and the etching amount s of a side wall, and the items of the processing results of the reference process are the etching amount o outside the hut 7 and the etching amount i inside the hut 7.

The etching amount s of the side wall in the target process is an amount etched inward from an end of the mask 2 at the side wall of the trench 3 as shown in an enlarged figure in FIG. 7. On the other hand, in the reference process, as shown in FIG. 11, the etching amount o is the etching amount in an area not covered with the hut 7, and the etching amount i is the etching amount in the area covered with the hut 7 (a dashed line in FIG. 11 indicates a position of the upper surface of the etch film 1 before etching).

The presence of the hut 7 causes few ions accelerated by sheath to be incident into the hut 7. On the other hand, since radicals diffuse equally unilaterally, the radicals can penetrate into the hut 7. Therefore, in the hut 7, etching progresses mainly by radicals as well as the side wall of the trench 3 of the target sample. On the other hand, since there are no obstacles preventing the ions from entering outside the hut 7, etching progresses by both the ions and radicals as well as the bottom of the trench 3 of the target sample. In this example, since the material of the etch film 1 is the same between the target sample and the reference sample, the reaction process when etching progresses is similar between the side wall of the trench 3 of the target sample and the inside of the hut 7 of the reference sample, and between the bottom of the trench 3 of the target sample and the outside of the hut 7 of the reference sample.

However, a scale is different between the trench 3 of the target sample and the hut 7 of the reference sample, and the amount of radicals entering the trench 3 is smaller than the amount of radicals entering the hut 7. As in the second example, the amount of ions and radicals reaching the bottom of the trench 3 of the target sample is smaller than the amount reaching on the flat etch film outside the hut of the reference sample. For that reason, the trench depth h and the etching amount s of the target sample and the etching amount o outside the hut 7 and the etching amount i inside the hut 7 in the reference sample may differ in the etching rate characteristics for the processing conditions, that is, the true I/O relationship may not be similar.

As described above, since many factors affect the true I/O relationship of the semiconductor process, it is often doubtful whether or not the true I/O relationship between the target process and the reference process is similar, and it is not easy to determine whether or not the reference processing data is appropriate. In this embodiment, as will be described later, it can be automatically determined whether or not the reference processing data is appropriate for performing transfer learning, and the utilization of the reference processing data can be avoided when the reference processing data is inappropriate.

An example in which the sample differs as the reference process has been described, but the processing data obtained by a processing device different from a processing device used in the target process may be dealt with as reference processing data. Examples of such processing include processing using processing devices each with different model numbers and processing devices with different parts of hardware. Alternatively, even if the hardware configuration is the same, depending on an individual difference between the processing devices, the processing data obtained by the processing device that does not result in the same processing results even though the processing for the same sample under the same processing conditions is performed may be dealt with as the reference processing data.

Furthermore, the reference processing data may not be data obtained by actually processing the sample by the processing device, and may be acquired by simulation of the target process. For example, geometric optical simulation, wave optical simulation using Maxwell equations, fluid simulation using Navier Stokes equations, or molecular dynamics simulation is performed, and the combination of simulation conditions and simulation results may be used as the reference processing data.

Figure 12:
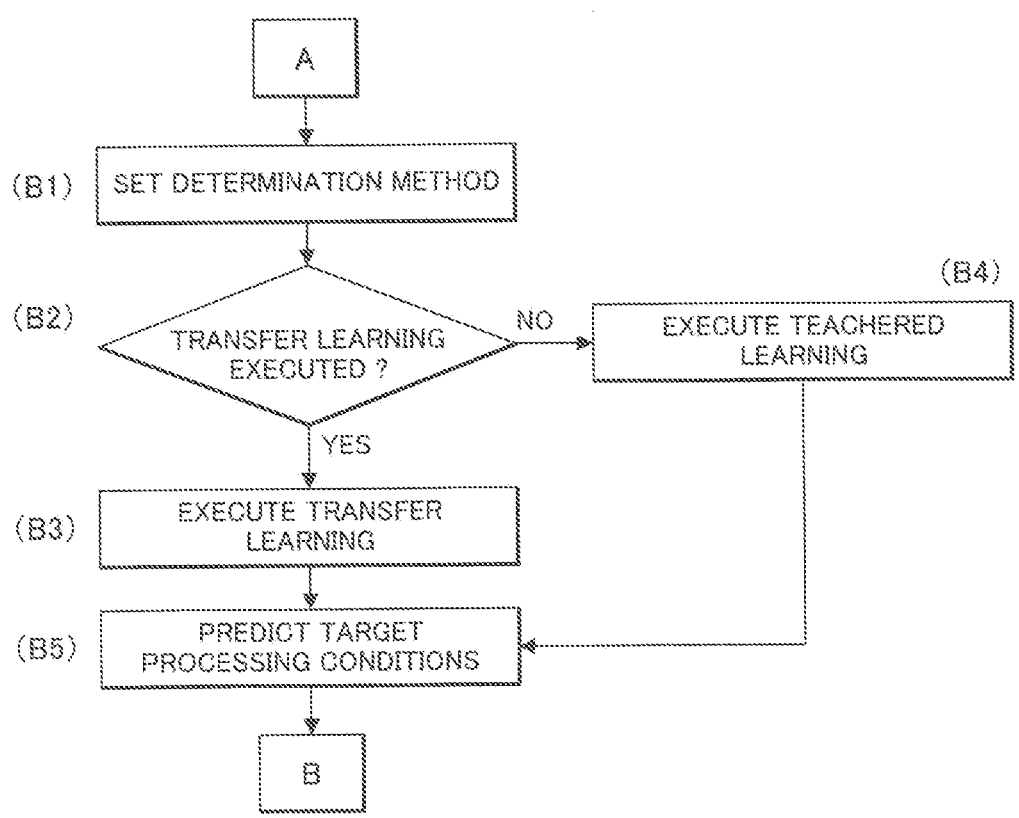
FIG. 12 is a flowchart showing a procedure until the prediction of a target processing condition after building the initial processing database.

FIG. 12 is a flowchart illustrating Steps (B1) to (B5) until the prediction of the target processing condition after building the initial processing database.

(B1): A method of determining whether the transfer learning execution unit 1102 or the teachered learning execution unit 1103 is used to estimate the I/O model of the target process is set. The determination method will be described later.

(B2): The transferability determination unit 1101 determines whether the transfer learning execution unit 1102 or the teachered learning execution unit 1103 is used to estimate the I/O model of the target process by the determination method set in (B1).

(B3): If the determination result in (B2) is yes, the transfer learning execution unit 1102 estimates the I/O model of the target process.

(B4): If the determination results in (B2) is No, the teachered learning execution unit 1103 estimates the I/O model of the target process.

(B5): The target processing conditions are predicted based on the I/O model of the estimated target process.

First, a method for determination by the transferability determination unit 1101 will be described. Hereinafter, four determination methods will be described.

A determination method 1 is a determination method based on whether or not to satisfy a condition that the true I/O relationship between the target process and the reference process is similar. This condition can be determined according to whether or not the processing result in the target process and the processing result in the reference process under the same processing condition have a strong correlation. In such a determination method 1, when a correlation coefficient (called "correlation coefficient between outputs") between the objective variable of the target process and the objective variable of the reference process corresponding to the same description variable exceeds a predetermined threshold specified by the user, the transfer learning execution unit 1102 is used to estimate the I/O model of the target process, and when the correlation coefficient does not exceed the predetermined threshold, the teachered learning execution unit 1103 is used to estimate the I/O model of the target process.

An example of determination by the determination method 1 will be described. Similarly, an etching process for forming a Line and Space pattern on the sample will be described as an example. The objective variable of the target process and the objective variable of the corresponding reference process are both set as trench depths, and both the description variables are set as pressure values in the processing room where processing is performed. In addition, the predetermined threshold is set to 0.7.

Figure 13A:
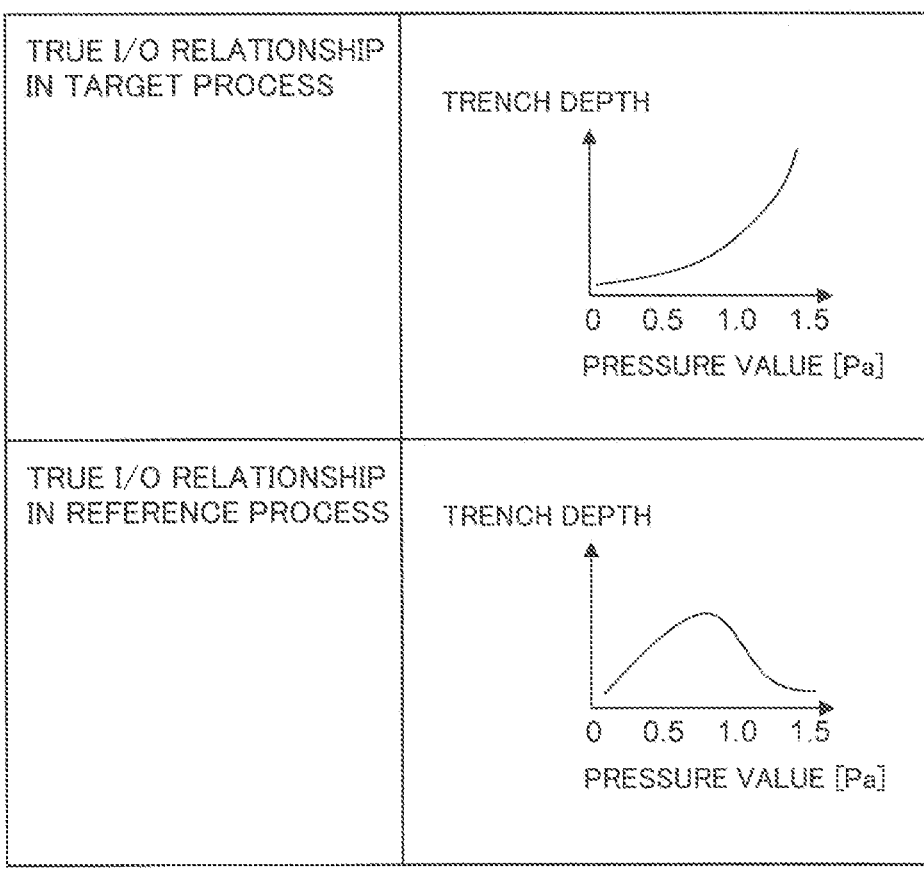
FIG. 13A is a diagram illustrating a determination method 1.

The true I/O relationship in the target process and the true I/O relationship in the reference process are shown in FIG. 13A. That is, while the true I/O relationship of the target process tends to increase the trench depth together with the pressure value, the true I/O relationship of the reference process tends to increase the trench depth together with the pressure value up to about 0.8 Pa, but the trench depth tends to decrease more as the pressure value increases more above around 0.8 Pa.

Figure 13B:
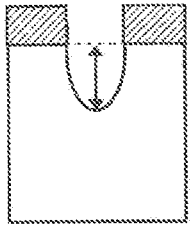
FIG. 13B is a diagram illustrating the determination method 1.

In the example shown in FIG. 13A, a number of target processing data and a number of reference processing data are shown in FIG. 13B. When the true I/O relationship is different as shown, the correlation coefficient between the outputs is expected to be lower. In that case, if the correlation coefficient between the outputs does not exceed 0.7, it is determined that the I/O model of the target process is estimated by the teachered learning execution unit 1103. In this way, quantitative indicators can avoid the execution of transfer learning based on inappropriate reference processing data.

In this example, there is the description variable (in this case, a pressure value) common to the target processing data and the reference processing data. On the other hand, when there is no reference processing data having a common description variable with the target processing data, the correlation coefficient between the outputs is calculated as follows. The reference I/O model is estimated based on the reference processing database. The reference objective variable corresponding to the same description variable as the description variable of the target processing data is estimated based on the estimated reference I/O model. As a result, the target objective variable and the reference objective variable corresponding to the same description variable can be obtained, and the correlation coefficient between the outputs can be calculated.

The determination method 2 is a determination method based on whether or not to satisfy a condition that the I/O model estimated from the reference processing data is more accurate than the I/O model estimated from the target processing data. This condition can be determined according to a distance between the distribution of the target description variable (processing condition of the target processing data) and the distribution of the reference description variable (processing condition of the reference processing data). If the distance between those distributions is large, there is little reference processing data in an area where the target description variable is distributed, and the accuracy of the reference I/O model tends to be low in that area. Therefore, in this determination method, the distance between the distribution of the target description variable and the distribution of the reference description variable, for example, Kullback-Leibler divergence or Maximum mean discrepancy is calculated. If the calculated distance exceeds a predetermined value specified by the user, the teachered learning execution unit 1103 estimates the I/O model of the target process, and if the distance does not exceed the predetermined value, the transfer learning execution unit 1102 estimates the I/O model of the target process.

An example of determination by the determination method 2 will be described. As the distance between the distribution of the target description variable and the distribution of the reference description variable, the Kullback-Leibler divergence of the distribution of the target description variable for the distribution of the reference description variable is employed. When a value of the Kullback-Leibler divergence exceeds 0.3, the I/O model of the target process is estimated by the teachered learning execution unit 1103, and when the value does not exceed 0.3, the I/O model of the target process is estimated by the transfer learning execution unit 1102.

Figure 14:
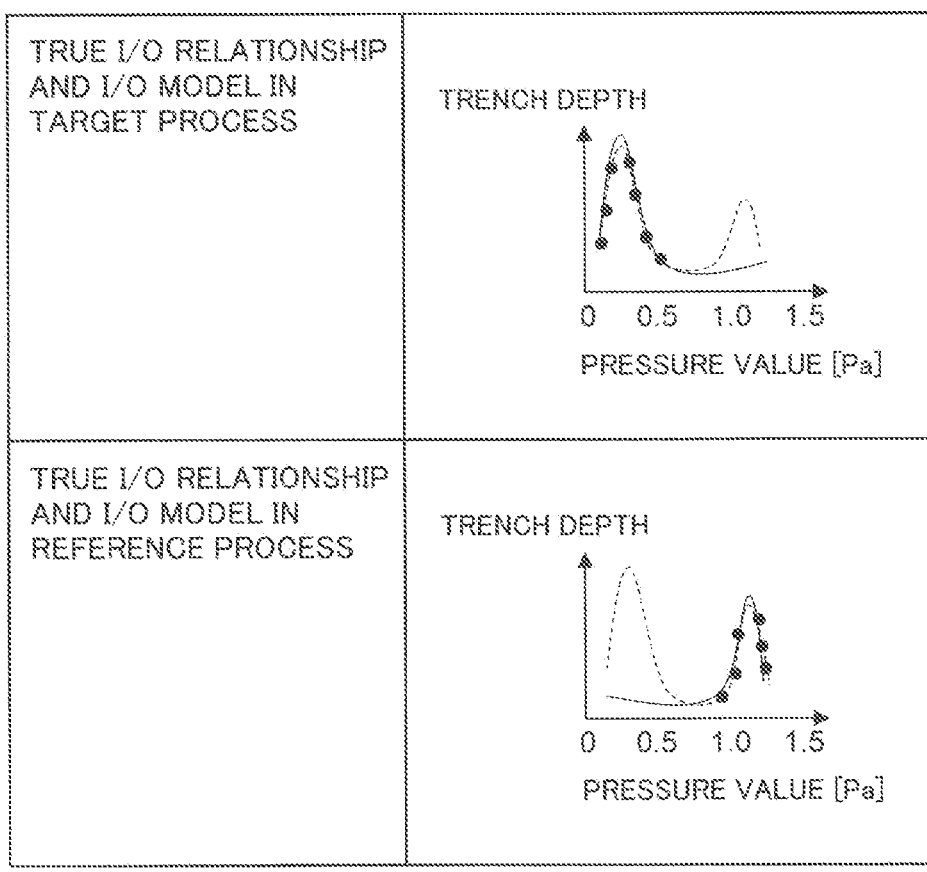
FIG. 14 is a diagram illustrating a determination method 2.

In FIG. 14, an upper part shows the true I/O relationship in the target process and the I/O model of the target process estimated based on the target processing data of the processing database 1111, and a lower part shows the true I/O relationship in the reference process and the I/O model of the reference process estimated based on the reference processing data of the reference processing database 1112. In both parts, a dashed line represents the true I/O relationship, a solid line indicates the I/O model, and black dots represent processing data contained in the database.

In this example, all the target processing data is obtained by processing at a pressure value of 0.5 Pa or less. On the other hand, all the reference processing data is acquired by processing at a pressure value of 1.0 Pa or more. When the distributions of the description variables do not overlap each other in this way, the value of the Kullback-Leibler divergence increases, and if the value of the Kullback-Leibler divergence exceeds 0.3, it is determined that the teachered learning execution unit 1103 estimates the I/O model of the target process. In this way, quantitative indicators can avoid the execution of transfer learning based on inappropriate reference processing data.

The determination method 3 is a determination method based on the ratio of the number of reference processing data pieces to the number of target processing data pieces. In general, the accuracy of the I/O model is lower as the database is smaller. Therefore, if the ratio of the number of reference processing data pieces to the number of target processing data pieces is low, the condition that the I/O model estimated from the reference processing data is more accurate than the I/O model estimated from the target processing data is often not met.

Therefore, it is determined that if the ratio of the number of reference processing data pieces to the number of target processing data pieces exceeds the predetermined value specified by the user, the transfer learning execution unit 1102 estimates the I/O model of the target process, and if the ratio does not exceed the predetermined value, the teachered learning execution unit 1103 estimates the I/O model of the target process.

Figure 3A:
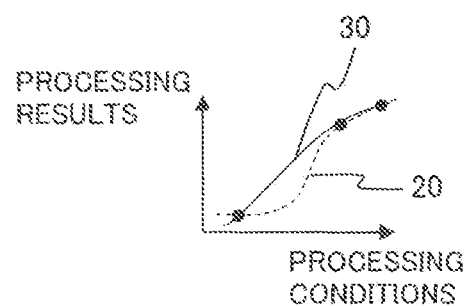
FIG. 3A is a diagram illustrating a problem of the present invention.
Figure 3B:
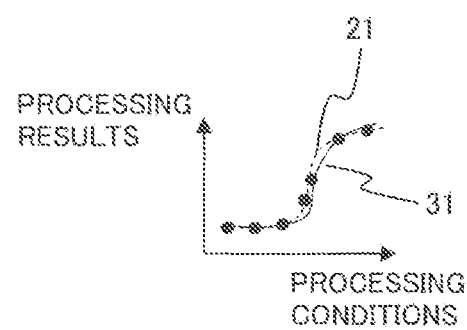
FIG. 3B is a diagram illustrating a problem of the present invention.
Figure 3C:
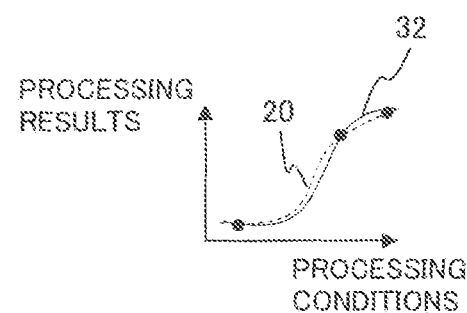
FIG. 3C is a diagram illustrating a problem of the present invention.

The determination method 4 is a method of cross-verifying the respective I/O models of the target processes estimated by transfer learning and teachered learning, and determining which I/O model is to be employed based on the results, unlike the above determination methods 1 to 3. In that case, an arithmetic resource is required to perform cross-verification for both the transfer learning and the teachered learning, but if the number of verification experiments using the processing device 1010 can be reduced, the total cost for deriving processing conditions can be reduced. In that case, cross-verification is performed on the I/O model of the target process estimated by the teachered learning (see FIG. 3A) and the I/O model of the target process estimated by the transfer learning (see FIG. 3C), and an evaluation value of the accuracy of the I/O model of the target process (generalization performance here) is calculated. When the evaluation value of the generalization performance of the I/O model of the target process estimated by the transfer learning exceeds the evaluation value of the generalization performance of the I/O model of the target process estimated by the teachered learning, the transfer learning execution unit 1102 estimates the I/O model of the target process, and if not so, the teachered learning execution unit 1103 estimates the I/O model of the target process.

The transferability determination unit 1101 determines the learning method by one or a combination of the above four methods. For example, in combination with the determination method 1 and the determination method 3, when the correlation coefficient between the outputs exceeds the predetermined value specified by the user, and the ratio of the number of reference processing data pieces to the number of target processing data pieces exceeds the predetermined value specified by the user, the transfer learning execution unit 1102 estimates the I/O model of the target process.

Figure 15:
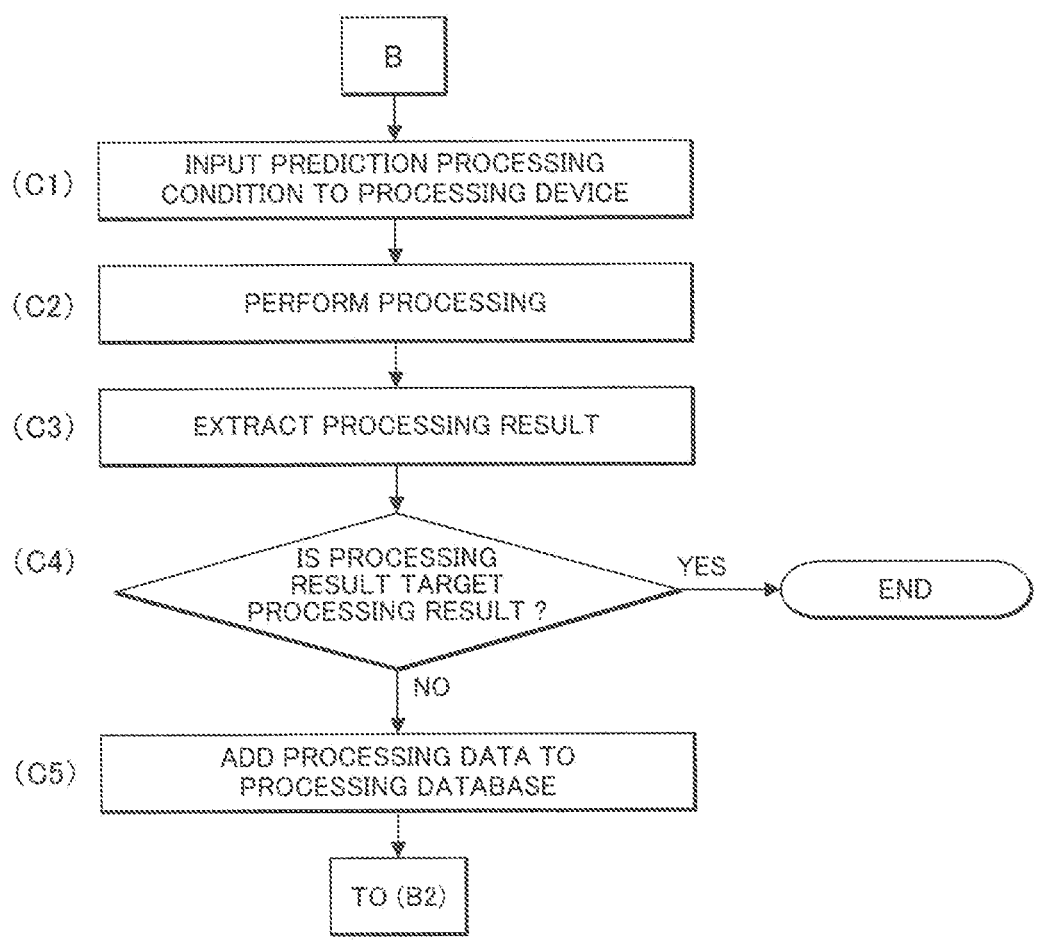
FIG. 15 is a flowchart showing a procedure from the prediction of the target processing condition to the end.

FIG. 15 is a flowchart illustrating Steps (C1) to (C5) till an end after predicting the target processing conditions.

(C1): The prediction processing conditions are input to the processing device 1010. This input may be performed automatically, for example, over a network. Further, the prediction processing conditions may be output to the output device 2003, so that the user recognizes the prediction processing condition, and the user may input the prediction processing conditions to the processing condition input unit 1011 of the processing device 1010.

(C2): The processing unit 1012 performs processing on the target sample according to the prediction processing conditions.

(C3): The measuring device 1020 extracts the processing results from the sample in which Step (C2) has been performed.

(C4): It is determined whether the processing results obtained in Step (C3) satisfy the target processing result. If the processing results satisfy the target processing results, the prediction processing conditions are output to the output device 2003 as the target processing conditions, and the flow is terminated. If the processing results do not satisfy the target processing results, the process proceeds to Step (C5).

(C5): The processing data, which is a combination of the prediction processing conditions used in Step (C2) and the processing results extracted in Step (C3), is added to the processing database 1111. After the processing data has been added to the processing database 1111, the process returns to Step (B2) (see FIG. 12).

Subsequently, a GUI output to the output device 2003 in the processing condition derivation system of the first embodiment will be described.

Figure 16:
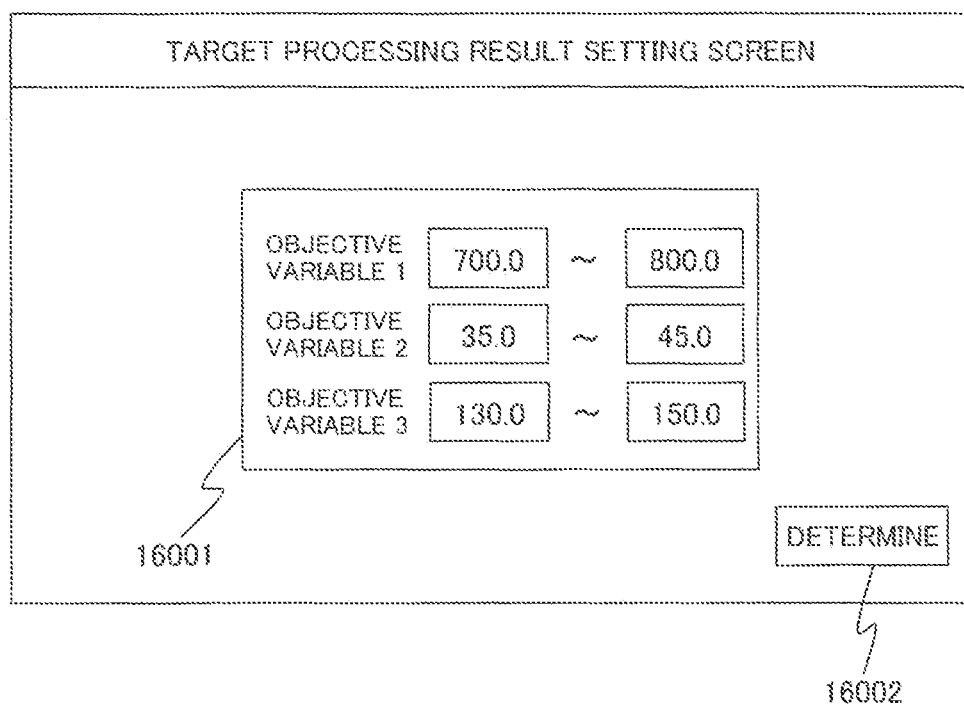
FIG. 16 shows an example of a GUI for inputting a target processing result.

FIG. 16 shows an example of the GUI for setting the target processing results in Step (A2). A target processing result setting screen 16000 includes a target processing result field 16001 and a determination button 16002. The target processing result field 16001 is a field for entering the target processing results, and an upper limit value and a lower limit value can be input for each item of the target objective variables. The processing results that fall between the upper limit value and the lower limit value is the target processing results. In addition, the method of setting the target processing results is not limited to the input of the upper limit value and the lower limit value. For example, a predetermined processing result may be set, and a processing result that falls within a predetermined error range based on the predetermined processing result may be a target processing result. In this case, a field is provided to enter the reference processing result and a value that defines the error range. With pressing the determination button 16002, the processing result input in the target processing result field 16001 is set as the target processing result.

Figure 17:
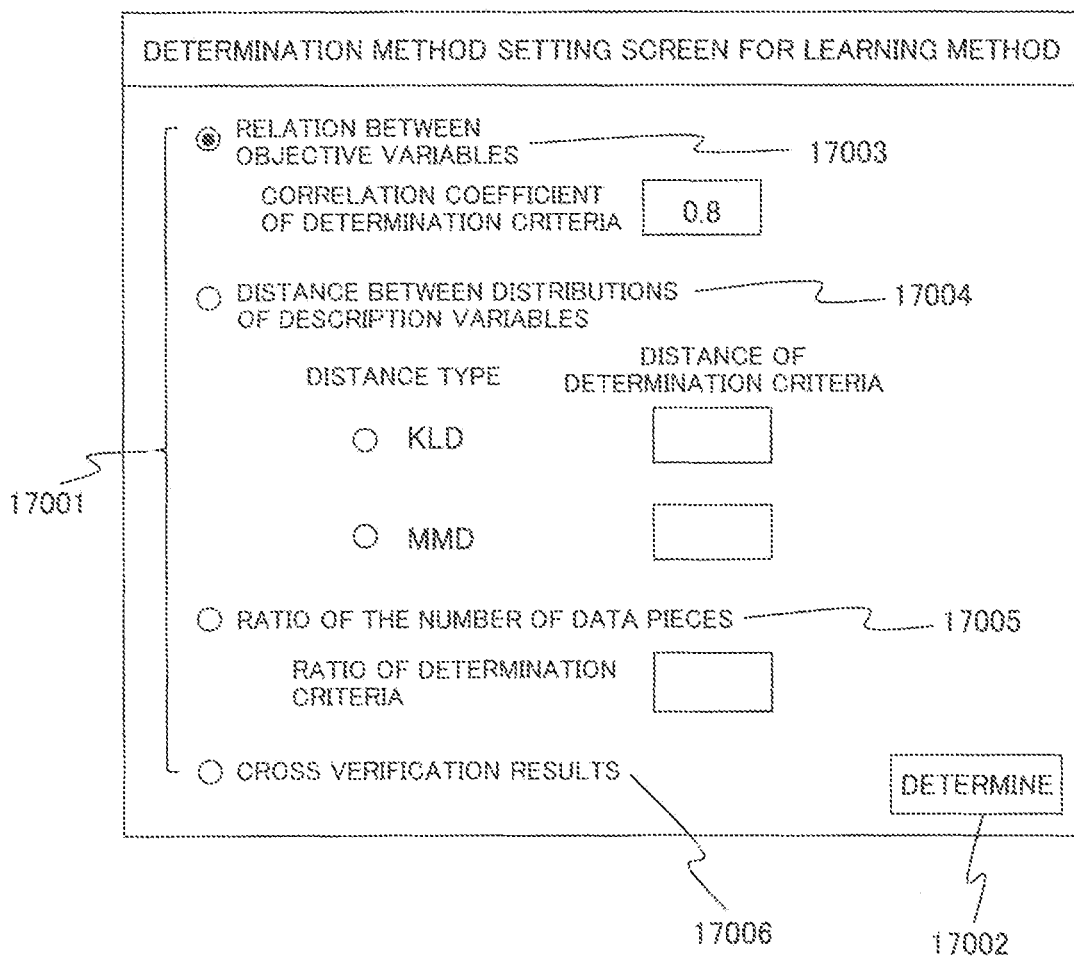
FIG. 17 shows an example of the GUI for setting a determination method by the transferability determination unit.

FIG. 17 shows an example of the GUI for setting a determination method in Step (B1). A determination method setting screen 17000 includes a radio button 17001 for selecting the determination method and a determination button 17002. Options 17003 to 17006 correspond to the above-described determination methods 1 to 4, respectively. The user selects a method for determining the learning method and one or more options to be set by the radio button 17001, and if necessary, sets a value that is a determination criterion.

Second Embodiment

When the learning method is determined by the determination method 1 described in the first embodiment, and when it is determined that the reference processing data is inappropriate for use for transfer learning, it may be possible to improve the correlation coefficient between outputs by resetting the reference objective variable. In a second embodiment, a processing condition derivation system having a function of resetting the reference objective variable will be described. The reference objective variable is reset to enable the I/O model of the target process to be estimated by the transfer learning execution unit 1102, the number of verification experiments can be reduced, and the process development period and process development cost can be efficiently reduced.

Figure 18:
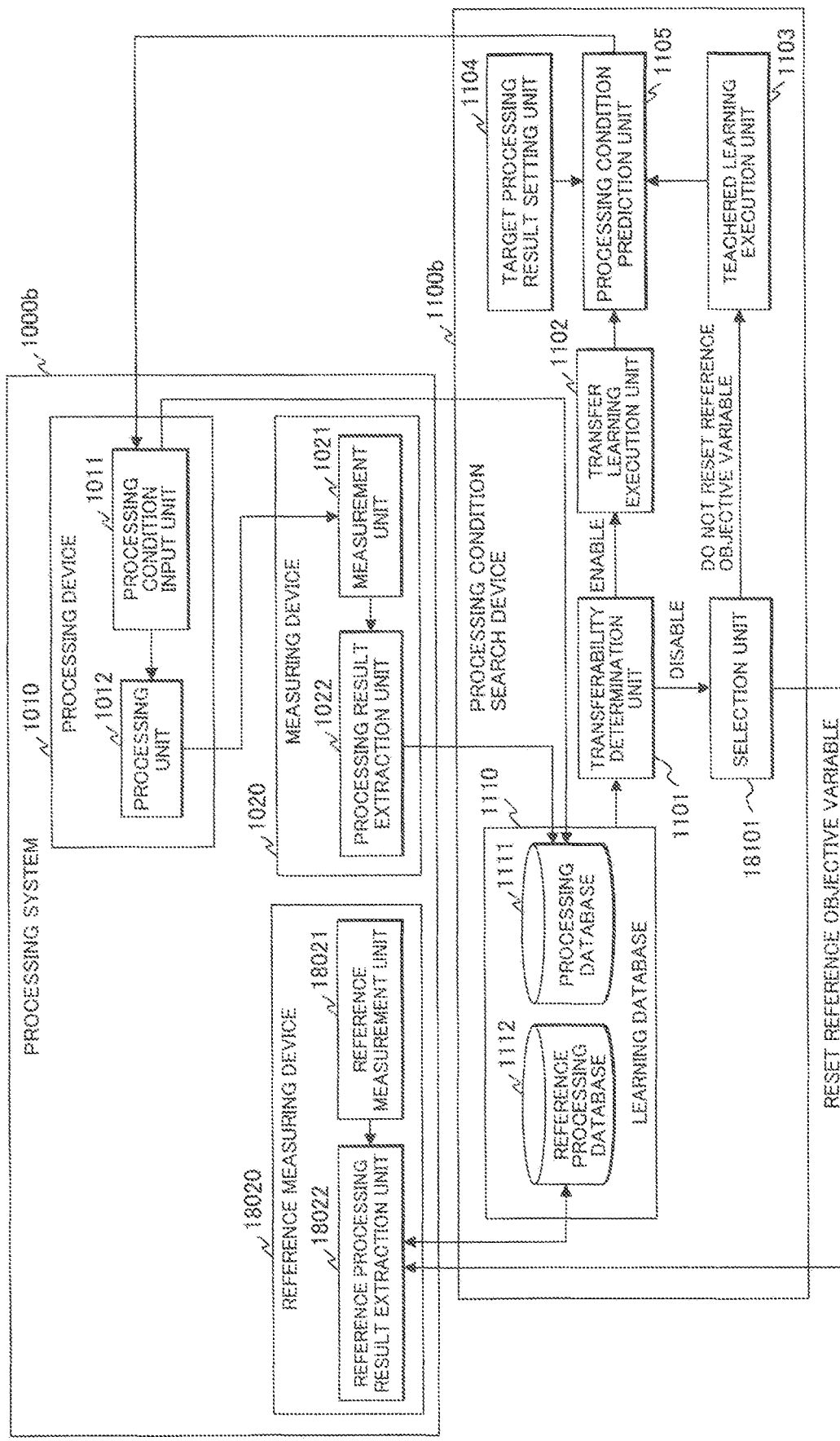
FIG. 18 is a block diagram showing a configuration example of a processing condition derivation system according to a second embodiment.

FIG. 18 is a block diagram showing a configuration example of the processing condition derivation system of the second embodiment. Blocks having the same function as the blocks of the processing condition derivation system of the first embodiment are denoted by the same signs, and detailed descriptions thereof will be omitted. The processing condition derivation system has a processing system 1000b and a processing condition search device 1100b. A processing device 1010, a measuring device 1020, a reference measuring device 18020, and a processing condition search device 1100b included in the processing condition derivation system are connected to each other directly or over a network.

A reference measuring device 18020 is newly added to the processing system 1000b. The reference measuring device 18020 is a device for extracting the processing results (reference processing results) of the reference process. The reference measuring device 18020 is a device for extracting the processing results from a reference sample processed by a processing device of the reference process not shown, but in this embodiment, in particular, for the reference sample pertaining to reference processing data, the reference measuring device 18020 is used to measure a value indicating a shape or property different from the processing results of an original reference processing data, extract different processing results, and obtain new reference processing data.

The reference measuring device 18020 includes a reference measurement unit 18021 and a reference processing result extraction unit 18022. The reference measurement unit 18021 measures a value indicating the shape, properties, and the like of the sample for the reference sample. The reference processing result extraction unit 18022 extracts the reference processing results from the measurement results by the reference measurement unit 18021.

A selection unit 18101 is newly added to the processing condition search device 1100b. In the selection unit 18101, when it is determined that the transfer learning is inappropriate, it is selected whether or not to reset the reference objective variable of the reference processing data.

Hereinafter, a derivation procedure of the target processing conditions by the processing condition derivation system in FIG. 18 will be described. The procedure from a start to the build of the initial processing database is the same as the procedure of FIG. 6 described in the first embodiment.

Figure 19:
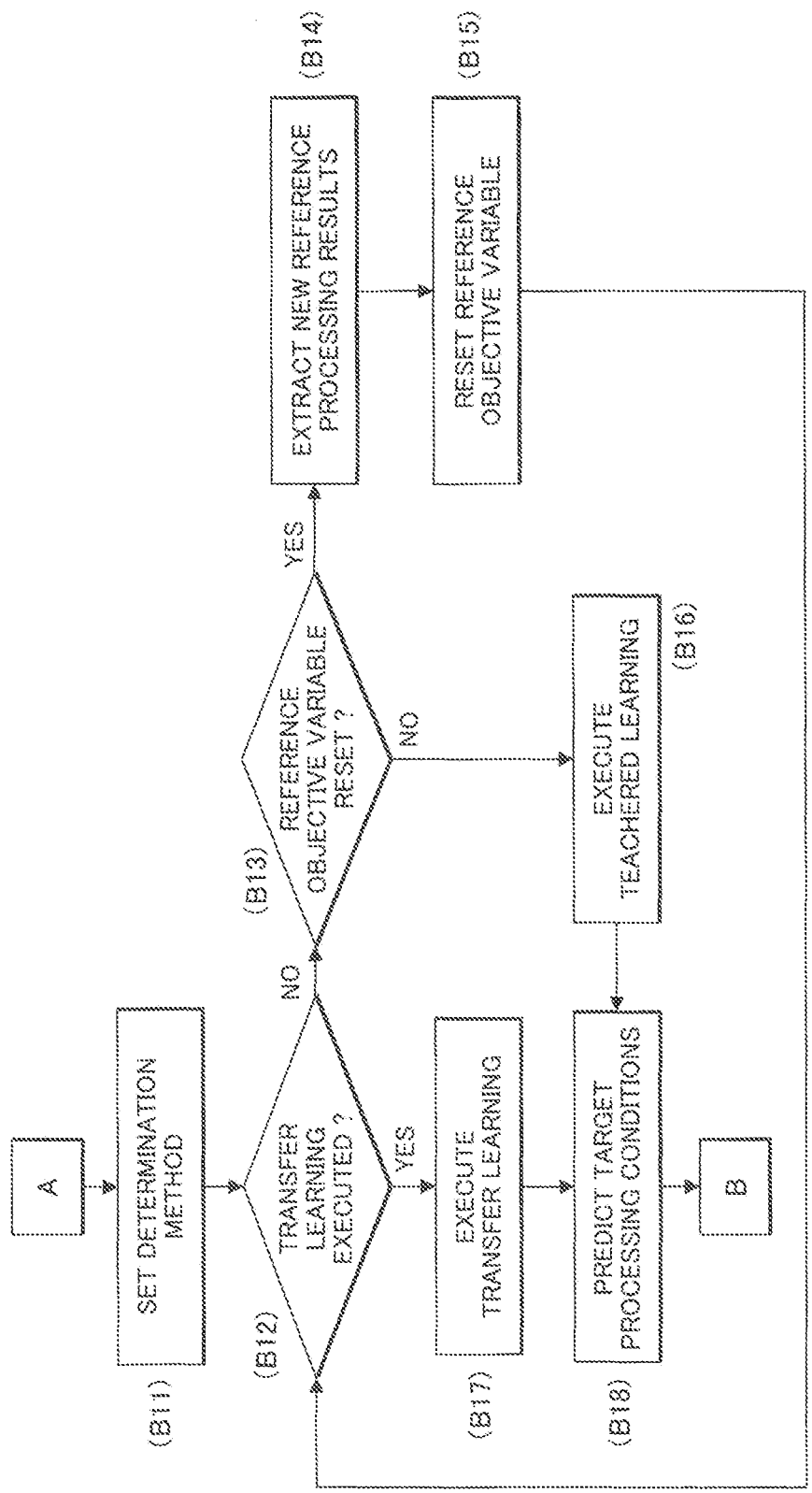
FIG. 19 is a flowchart showing a procedure until the prediction of a target processing condition after building an initial processing database.

FIG. 19 is a flowchart illustrating procedures (B11) to (B18) till the prediction of the target processing conditions after building the initial processing database.

(B11): A method of determining whether the transfer learning execution unit 1102 or the teachered learning execution unit 1103 is used to estimate the I/O model of the target process is set. In this example, the determination method 1 described in the first embodiment is set.

(B12): It is determined whether or not a correlation coefficient between outputs exceeds a predetermined value. The process proceeds to (B13) if the correlation coefficient does not exceed the predetermined value, and the process proceeds to (B17) if the correlation coefficient exceeds the predetermined value.

(B13): The selection unit 18101 selects whether or not to reset the reference objective variable. The process proceeds to (B14) if the reference objective variable is reset, and the process proceeds to (B16) if the reference objective variable is not reset.

(B14): With the use of the reference measuring device 18020, a new measurement is performed on the reference sample according to the reference processing data, and the items of new reference processing results are defined. An example of newly defining the items of the reference processing results will be described later.

(B15): At least one or more items of the extracted reference processing results are set as reference objective variables. At that time, the correlation coefficient between the outputs is set to be higher than that before resetting. If there are a number of methods for setting the correlation coefficient between the outputs to be higher than that before resetting, resetting may be performed by the user's determination or may be automatically performed. In the automatic resetting method, for example, for each item of the objective variable of the target processing data, one item with the highest correlation coefficient between the outputs is selected from the items of the reference processing results, and set as the reference objective variable. An example of resetting the reference objective variable will be described later. After resetting the reference objective variable, the process returns to (B12). In addition, if there is no method of setting the correlation coefficient between outputs to be higher than that before resetting, the process returns to (B12) without resetting.

(B16): If the determination result in (B13) is No, the teachered learning execution unit 1103 estimates the I/O model of the target process. After the I/O model of the target process has been estimated, the process proceeds to (B18).

(B17): If the determination result (B12) is Yes, the transfer learning execution unit 1102 estimates the I/O model of the target process. After the I/O model of the target process has been estimated, the process proceeds to (B18).

(B18): The target processing conditions are predicted based on the I/O model of the estimated target process.

In Step (B13), when there is an item that is not used as the reference objective variable among the items of the extracted reference processing results, a new measurement for newly extracting the reference processing results may not be performed in Step (B14), and in Step (B15), the reference objective variable may be set from among the reference processing results that are not used.

Figure 20:
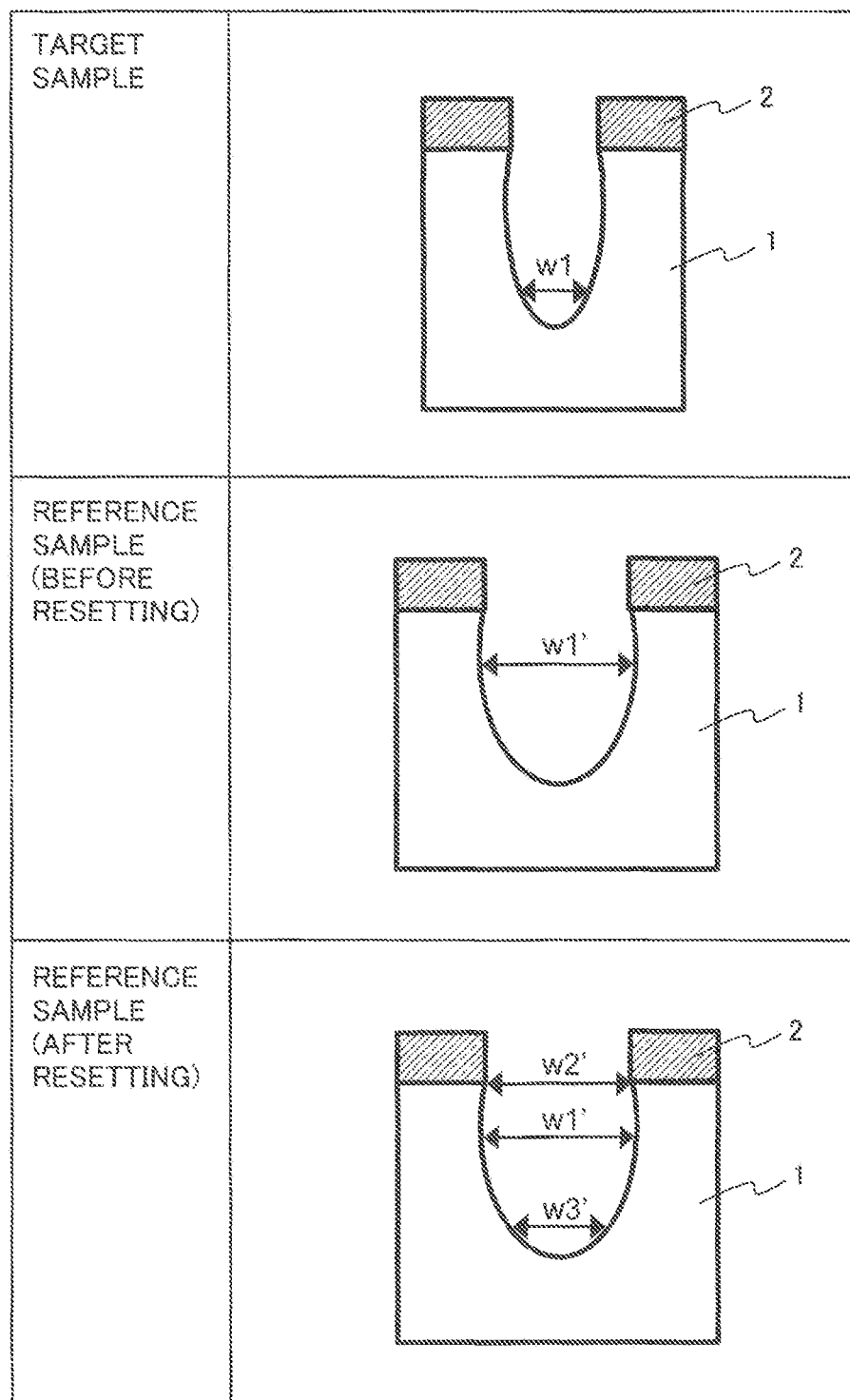
FIG. 20 is a diagram illustrating a method of resetting a reference objective variable.

In Steps (B14) and (B15), an example of newly defining an item of the reference processing result and resetting the reference objective variable will be described with reference to FIG. 20. The target sample is a sample on which a Line and Space pattern is formed, shown in an upper part of FIG. 20, and the reference sample is a sample on which a Line and Space pattern different in a width of a mask opening is formed, shown in middle and lower parts in FIG. 20. Further, the target objective variable is defined as a trench width w1 at a bottom of a trench shown in the upper part of FIG. 20, and the reference objective variable before resetting is defined as a maximum trench width w1' in the trench shown in the middle part of FIG. 20. A correlation between the trench width w1 and the maximum trench width w1' is low, and in Step (B13), it is assumed that a selection has been made to reset the reference objective variable.

In Step (B14), new reference processing results are extracted from the reference sample using the reference measuring device 18020. The newly extracted reference processing results are defined as a trench width w2' in the vicinity of a mask interface and a trench width w3' at the bottom of the trench shown in the lower part of FIG. 20.

Figure 21A:
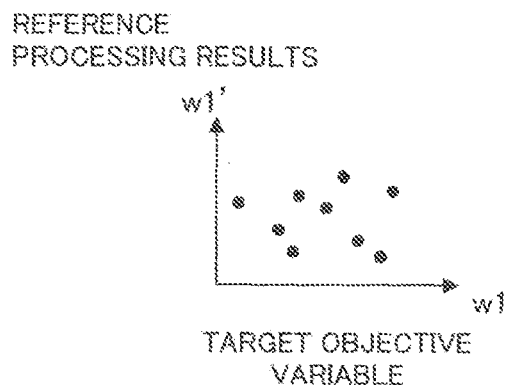
FIG. 21A is a diagram illustrating a method of selecting a reference objective variable from multiple reference processing results.
Figure 21B:
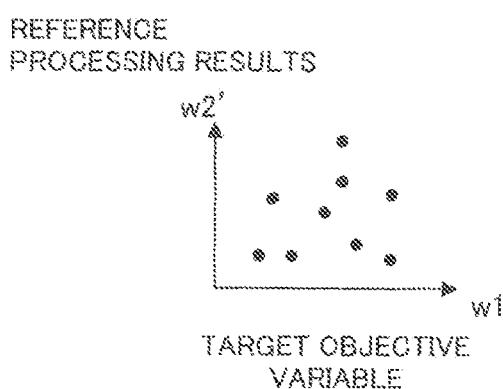
FIG. 21B is a diagram illustrating a method of selecting the reference objective variable from the multiple reference processing results.
Figure 21C:
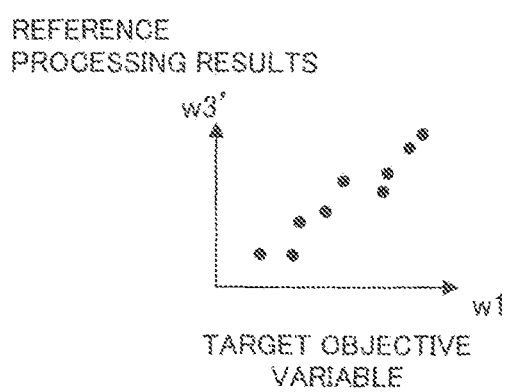
FIG. 21C is a diagram illustrating a method of selecting the reference objective variable from the multiple reference processing results.

From the target processing data in the learning database 1110, sets (w1, w1'), (w1, w2'), and (w1, w3') of the target objective variables and the reference processing results corresponding to the same processing conditions are extracted and plotted to obtain graphs shown in FIGS. 21A, 21B, and 21C, respectively. The horizontal axis is the target objective variable, and the vertical axis is the reference processing results. As shown in FIGS. 21A to 21C, the reference processing results w1' and w2' have a low correlation with the target objective variable w1, while the reference processing result w3' has a high correlation with the target objective variable w1. In this case, in Step (B15), the correlation coefficient between the outputs can be improved by changing the reference objective variable from the trench width w1' to the trench width w3'.

The procedure till the end after predicting the target processing conditions is the same as the procedure in FIG. 15 described in the first embodiment.

Next, in the processing condition derivation system of the second embodiment, the GUI output to the output device 2003 will be described.

Figure 22:
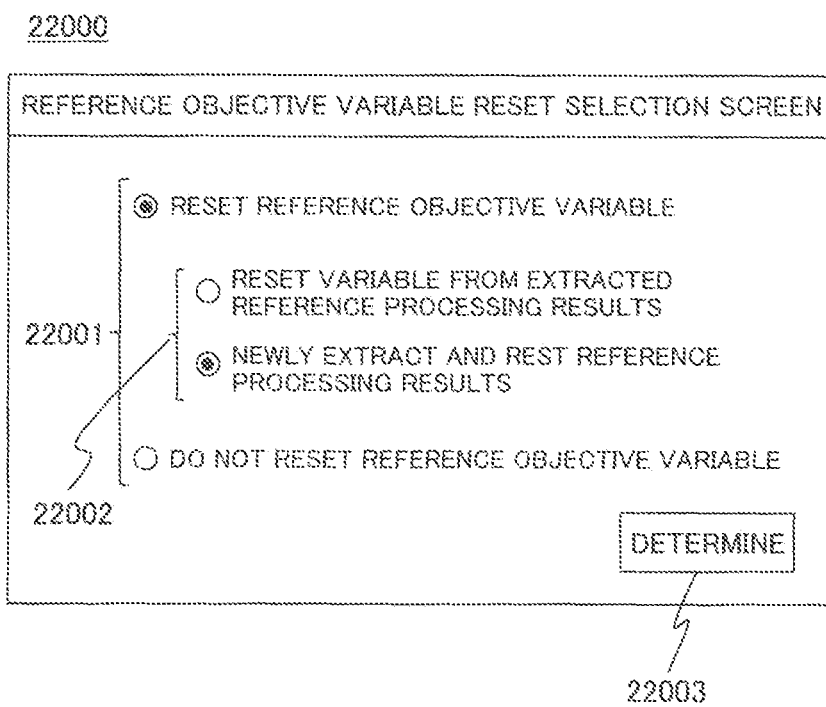
FIG. 22 shows an example of an GUI for setting the resetting of the reference objective variable.

FIG. 22 shows an example of a GUI for setting the resetting of the reference objective variable in Step (B13). A reference objective variable reset selection screen 22000 includes a radio button 22001 for selecting whether or not there is a need to reset the reference objective variable, a radio button 22002 for selecting whether or not to extract a new reference processing result when resetting, and a determination button 22003. The user selects a desired option by the radio buttons 22001 and 22002 and presses the determination button 22003 to set the resetting of the reference objective variable.

Figure 23:
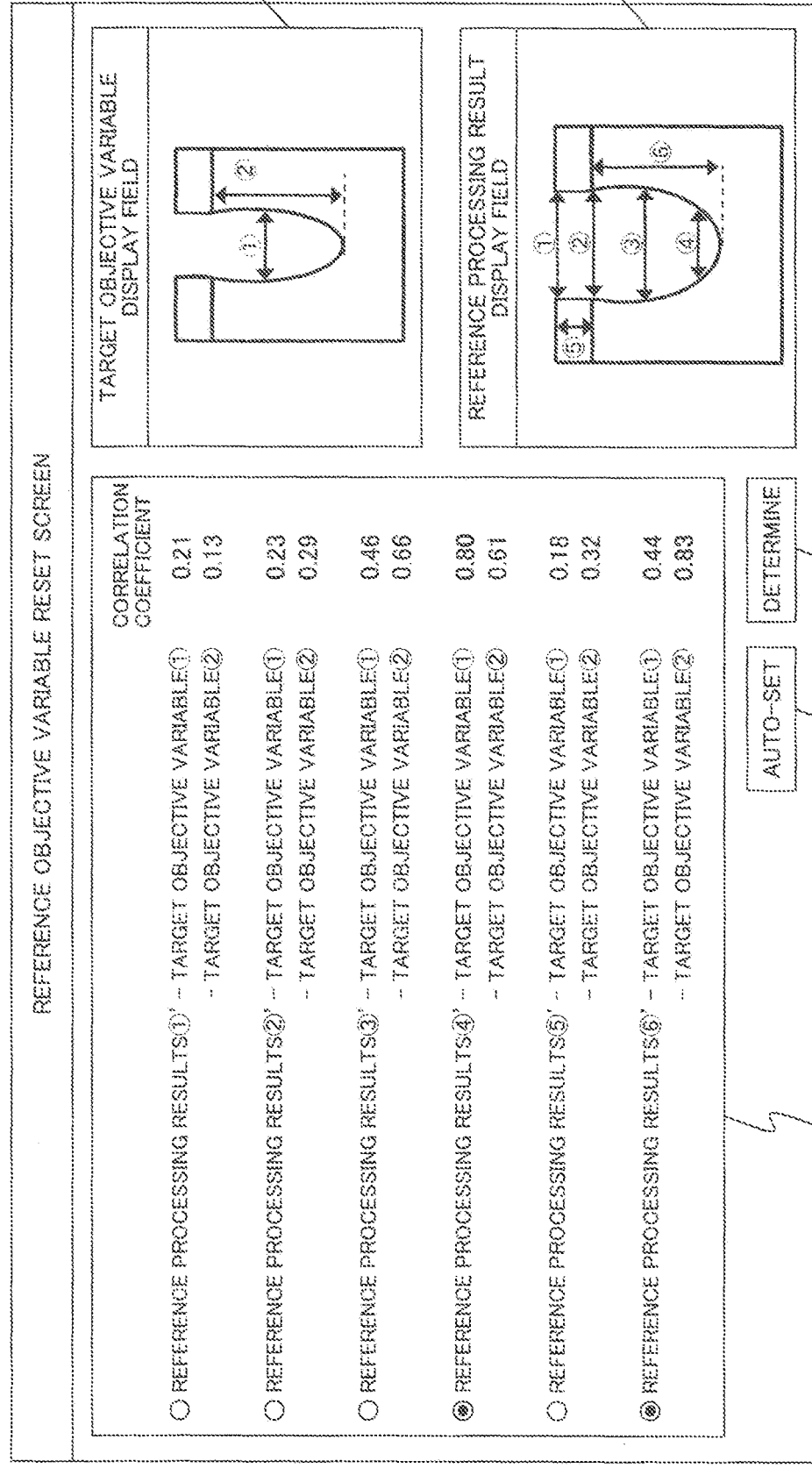
FIG. 23 shows an example of a GUI for resetting the reference objective variable.

FIG. 23 shows an example of the GUI for resetting the reference objective variable in Step (B15). A reference objective variable reset screen 23000 includes a reference objective variable reset field 23001, a target objective variable display field 23002, a reference processing result display field 23003, an automatic setting button 23004, and a determination button 23005. In the target objective variable display field 23002, all items of the target objective variables are displayed. In this example, a trench width is defined as a first target objective variable and a trench depth is defined as a second target objective variable. In the reference processing result display field 23003, all items of the reference processing results extracted from the target sample are displayed. In this example, the items of the six reference processing results extracted are displayed. The reference objective variable reset field 23001 includes a radio button for selecting the item of the reference objective variable from the reference processing results displayed by the user's determination. With the selection of the radio button, the user can select the reference processing result to be set as the reference objective variable. On the other hand, when the automatic setting button 23004 is pressed, the reference objective variable is automatically set by the method described in the description of Step (B15) so that the correlation coefficient between the outputs is higher than that before resetting.

The embodiments of the present invention have been described above using the derivation of the processing conditions of the semiconductor processes as an example. The application of the present invention is not limited to the derivation of the processing conditions of the semiconductor process. For example, the present invention can be implemented to derive molding conditions of a metal 3D printer. In the case of deriving the molding conditions of the metal 3D printer, the molding conditions correspond to the processing conditions in this embodiment, and the molding results correspond to the processing results in this embodiment. The reference processing data may be, for example, processing data when molding a sample having a shape different from that of the target sample.

REFERENCE SIGNS LIST

1: etch film, 2: mask, 3: trench, 4: substrate, 5: base film, 7: hut, 1000, 1000b: processing system, 1010: processing device, 1011: processing condition input unit, 1012: processing unit, 1020: measuring device, 1021: measuring unit, 1022: processing results extraction unit, 1100, 1100b: processing condition search device, 1110: learning database, 1111: processing database, 1112:

reference processing database, 1101: transferability determination unit, 1102: transfer learning execution unit, 1103: teachered learning execution unit, 1104: target processing result setting unit, 1105: processing condition prediction unit, 2000: arithmetic device, 2001: storage device, 2002: input device, 2003: output device, 2004: communication interface, 16000: target processing result setting screen, 16001: target processing result field, 16002: determination button, 17000: determination method setting screen, 17001, 22001, 22002: radio button, 17002, 22003, 23005: determination button, 18020: reference measuring device, 18021: reference measurement unit, 18022: reference processing result extraction unit, 18101: selection unit, 22000: reference objective variable reset selection screen, 23000: reference objective variable reset screen, 23001: reference objective variable reset field, 23002: target objective variable display field, 23003: reference processing result display field, 23004: automatic setting button.

What is claimed is:

1. A processing condition search device that searches for a processing condition of a target process, comprising:
   a target processing result setting unit that sets a target processing result in the target process;
   a learning database including a processing database that stores target processing data as a combination of the processing condition and the processing result in the target process, and a reference processing database that stores reference processing data as a combination of the processing condition and the processing result in a reference process;
   a teachered learning execution unit that estimates an I/O model of the target process as an I/O model between a target description variable and a target objective variable, with the processing condition of the target processing data defined as the target description variable and the processing result defined as the target objective variable, using the target processing data;
   a transfer learning execution unit that estimates an I/O model of the target process using a reference I/O model between a reference description variable and a reference objective variable and the target processing data, with the processing condition of the reference processing data defined as the reference description variable and the processing result defined as the reference objective variable;
   a transferability determination unit that determines whether the teachered learning execution unit or the transfer learning execution unit is used to estimate the I/O model of the target process; and
   a processing condition prediction unit that predicts the processing condition for realizing the target processing result, using the I/O model of the target process,
   wherein the transferability determination unit determines whether the teachered learning execution unit or the transfer learning execution unit is used to estimate the I/O model of the target process comprises determining that the transfer learning execution unit estimates the I/O mode of the target process when a correlation coefficient between the target objective variable and the reference objective variable for the same description variable exceeds a predetermined value, and the teachered learning execution unit estimates the I/O mode of the target process when the correlation coefficient does not exceed the predetermined value.

2. The processing condition search device according to claim 1,
   wherein the target process performs predetermined processing with a processing device on the target sample, and
   the reference process is a process different in one or more of the sample, the processing device, and the processing from the target process, or a simulation of the target process.

3. The processing condition search device according to claim 1, wherein the transferability determination unit determines whether the teachered learning execution unit or the transfer learning execution unit is used to estimate the I/O model of the target process comprises determining that the transfer learning execution unit estimates the I/O mode of the target process when a ratio of the reference processing data pieces to the number of target processing data pieces exceeds a predetermined value, and the teachered learning execution unit estimates the I/O mode of the target process when the ratio does not exceed the predetermined value.

4. The processing condition search device according to claim 1, wherein the transferability determination unit determines whether the teachered learning execution unit or the transfer learning execution unit is used to estimate the I/O model of the target process comprises performing cross-verification on the I/O model of the target process estimated by the teachered learning using the target processing data and the I/O model of the target process estimated by the transfer learning using the reference I/O model and the target processing data to calculate an evaluation value of generalization performance, and determines that the learning execution unit exceeding the evaluation value estimates the I/O model of the target process.

5. The processing condition search device according to claim 1, wherein the transferability determination unit includes a selection unit that selects whether or not to reset the reference objective variable when the transferability determination unit does not perform the determination that the transfer learning execution unit estimates the I/O model of the target process.

6. The processing condition search device according to claim 5, wherein the transferability determination unit determines that the transfer learning execution unit estimates the I/O mode of the target process when a correlation coefficient between the target objective variable and the reference objective variable for the same description variable exceeds a predetermined value, and the teachered learning execution unit estimates the I/O mode of the target process when the correlation coefficient does not exceed the predetermined value.

7. The processing condition search device according to claim 6, wherein the selection unit resets an item different from the item of the processing result in the reference process used as the reference objective variable of the reference I/O model as the reference objective variable.

8. The processing condition search device according to claim 7, wherein a correlation coefficient between the target objective variable and the reset reference objective variable for the same description variable exceeds a correlation coefficient between the target objective variable and the reference objective variable before resetting for the same description variable.

9. A processing condition search method using a processing condition search device for searching a processing condition of a target process,
   the processing condition search device including a learning database including a processing database that stores target processing data as a combination of the processing condition and the processing result in the target process, and a reference processing database that stores reference processing data as a combination of the processing condition and the processing result in a reference process; a target processing result setting unit; a teachered learning execution unit that estimates an I/O model of the target process as an I/O model between a target description variable and a target objective variable, with the processing condition of the target processing data defined as the target objective variable and the processing result defined as the target objective variable, using the target processing data; a transfer learning execution unit that estimates an I/O model of the target process using a reference I/O model between a reference description variable and a reference objective variable and the target processing data, with the processing condition of the reference processing data defined as the reference description variable and the processing result defined as the reference objective variable; a transferability determination unit; and a processing condition prediction unit, the method comprising:

setting a target processing result in the target process by the target processing result setting unit;

determining whether the teachered learning execution unit or the transfer learning execution unit is used to estimate the I/O model of the target process by the transferability determination unit; and predicting the processing condition for realizing the target processing result according to the I/O model of the target process estimated by either the teachered learning execution unit or the transfer learning execution unit, based on the determination of the transferability determination unit, by the processing condition prediction unit, wherein the transferability determination unit determines whether the teachered learning execution unit or the transfer learning execution unit is used to estimate the I/O model of the target process comprises determining that the transfer learning execution unit estimates the I/O mode of the target process when a correlation coefficient between the target objective variable and the reference objective variable for the same description variable exceeds a predetermined value, and the teachered learning execution unit estimates the I/O mode of the target process when the correlation coefficient does not exceed the predetermined value.

10. The processing condition search method according to claim 9, wherein the target process performs predetermined processing on the target sample with a processing device, and the reference process is a process different in one or more of the sample, the processing device, and the processing from the target process, or a simulation of the target process.

11. The processing condition search method according to claim 9, wherein the processing condition search device includes a selection unit, the method further comprising:

selecting whether or not to reset the reference objective variable when the transferability determination unit does not perform the determination that the transfer learning execution unit estimates the I/O model of the target process, by the selection unit.

* * * * *